(12) United States Patent
Alberth, Jr. et al.

(10) Patent No.: US 9,100,207 B2
(45) Date of Patent: Aug. 4, 2015

(54) SYSTEMS, DEVICES, AND METHODS FOR MAPPING DEVICES TO REALIZE BUILDING AUTOMATION AND ENERGY MANAGEMENT

(71) Applicant: Green Edge Technologies, Inc., Poway, CA (US)

(72) Inventors: William P. Alberth, Jr., Prairie Grove, IL (US); Seang Yong Chau, Los Altos, CA (US); David K Hartsfield, Poway, CA (US); Scott A. Steele, Poway, CA (US)

(73) Assignee: Green Edge Technologies, Inc., Poway, CA (US)

( * ) Notice: Subject to any disclaimer, the term of this patent is extended or adjusted under 35 U.S.C. 154(b) by 180 days.

(21) Appl. No.: 13/766,123

(22) Filed: Feb. 13, 2013

(65) Prior Publication Data
US 2014/0226851 A1    Aug. 14, 2014

(51) Int. Cl.
*G06K 9/00*    (2006.01)
*H04L 12/28*    (2006.01)
*G06Q 50/06*    (2012.01)

(52) U.S. Cl.
CPC ............ *H04L 12/2803* (2013.01); *G06Q 50/06* (2013.01)

(58) Field of Classification Search
None
See application file for complete search history.

(56) References Cited

U.S. PATENT DOCUMENTS

| | | | |
|---|---|---|---|
| 5,760,558 A | 6/1998 | Popat | |
| 5,877,957 A | 3/1999 | Bennett | |
| 6,112,127 A | 8/2000 | Bennett | |
| 6,385,495 B1 | 5/2002 | Bennett | |
| 6,400,996 B1 | 6/2002 | Hoffberg et al. | |
| 6,418,424 B1 | 7/2002 | Hoffberg et al. | |
| 6,912,429 B1 | 6/2005 | Bilger | |
| 7,336,192 B2 | 2/2008 | Aisa | |
| 7,339,466 B2 | 3/2008 | Mansfield et al. | |
| 7,406,353 B2 | 7/2008 | Bennett | |
| 7,480,746 B2 | 1/2009 | Simon et al. | |
| 7,813,831 B2 | 10/2010 | McCoy et al. | |
| 7,860,679 B2 | 12/2010 | Rouhier et al. | |
| 7,865,252 B2 | 1/2011 | Clayton | |
| 8,024,073 B2 | 9/2011 | Imes et al. | |

(Continued)

FOREIGN PATENT DOCUMENTS

EP    2 492 763 A1    8/2012
WO    WO 2012/018526 A1    2/2012

OTHER PUBLICATIONS

PCT International Search Report for corresponding International Application No. PCT/US2013/068974 and Written Opinion mailed on Feb. 18, 2014 (12 pages).

*Primary Examiner* — Hadi Akhavannik
(74) *Attorney, Agent, or Firm* — Bookoff McAndrews, PLLC

(57) ABSTRACT

The present disclosure is generally directed to systems and methods for mapping components of an automation system. More particularly, the present disclosure includes systems, devices, and methods for intelligently controlling one or more energy-consuming devices in a structure such as a residential, commercial, or industrial building. One embodiment includes a method of identifying a location of at least one component of an automation system, comprising obtaining an image of the at least one component, the image being captured by a wireless device; determining a location of the wireless device at the time of capturing the image; determining an identity of the at least one component; and associating the identity of the at least one component with the location.

13 Claims, 20 Drawing Sheets

(56) References Cited

U.S. PATENT DOCUMENTS

| | | |
|---|---|---|
| 8,094,034 B2 | 1/2012 | Patel et al. |
| 8,134,310 B2 | 3/2012 | Wacknov et al. |
| 8,183,995 B2 | 5/2012 | Wang et al. |
| 8,185,250 B2 | 5/2012 | Sato |
| 8,190,275 B2 | 5/2012 | Chang |
| 8,214,671 B2 | 7/2012 | Boss et al. |
| 8,234,363 B1 | 7/2012 | Kuo |
| 8,248,230 B2 | 8/2012 | Covaro et al. |
| 8,334,784 B2 | 12/2012 | Patel et al. |
| 2002/0035404 A1 | 3/2002 | Ficco et al. |
| 2002/0149891 A1 | 10/2002 | Neiger et al. |
| 2004/0138981 A1 | 7/2004 | Ehlers |
| 2006/0182311 A1* | 8/2006 | Lev ............................ 382/103 |
| 2008/0031493 A1* | 2/2008 | Brogren et al. ............. 382/103 |
| 2009/0072985 A1 | 3/2009 | Patel et al. |
| 2010/0171430 A1 | 7/2010 | Seydoux |
| 2010/0188229 A1 | 7/2010 | Nhep |
| 2010/0280667 A1 | 11/2010 | Steinberg |
| 2010/0305773 A1 | 12/2010 | Cohen |
| 2011/0018902 A1* | 1/2011 | Ofek ........................... 345/629 |
| 2011/0090042 A1 | 4/2011 | Leonard et al. |
| 2011/0243476 A1* | 10/2011 | Sieracki ...................... 382/291 |
| 2011/0313582 A1 | 12/2011 | Van Megen et al. |
| 2013/0030732 A1 | 1/2013 | Shetty et al. |

* cited by examiner

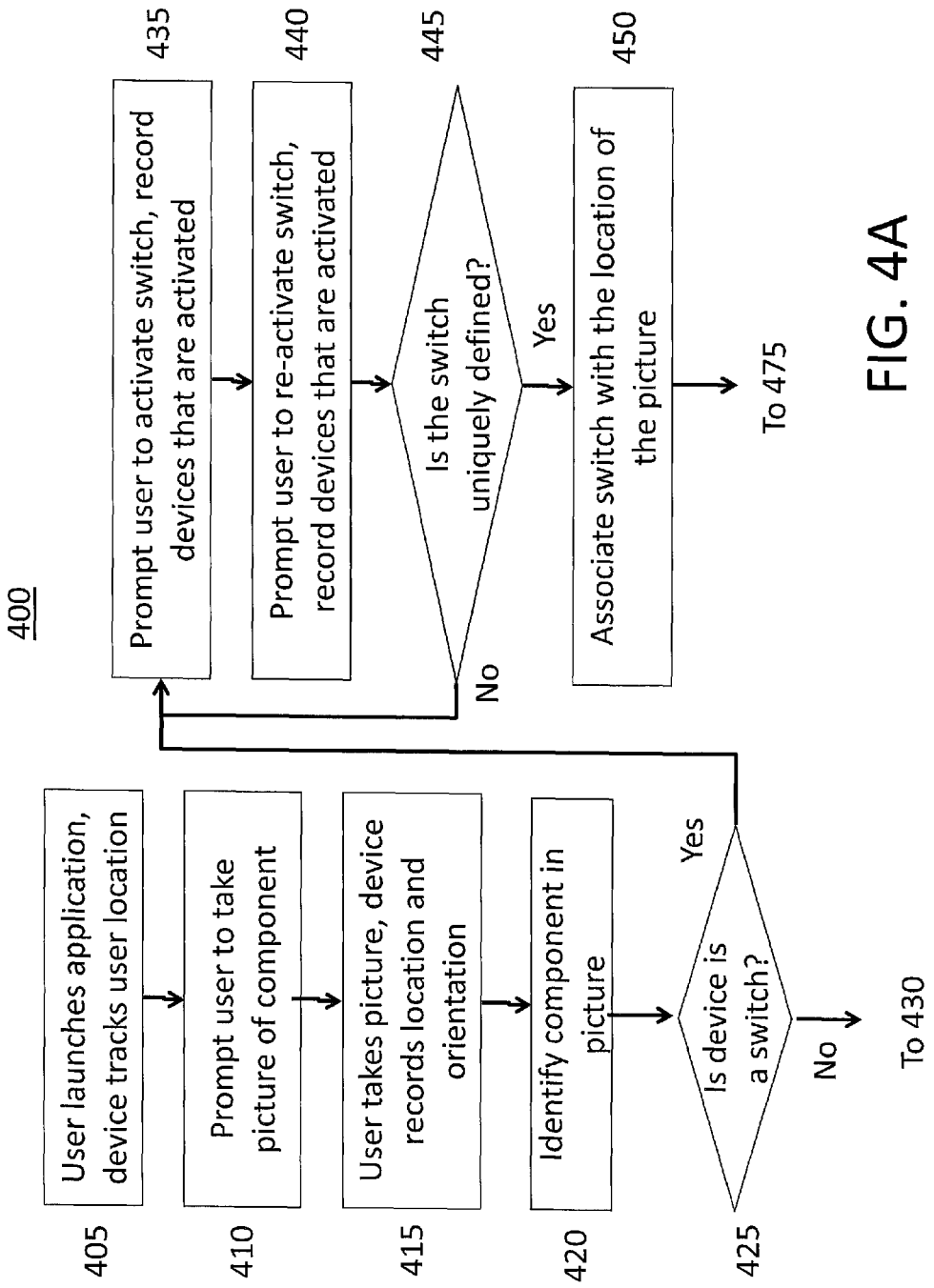

1000

| 1500 | | | | | |
|---|---|---|---|---|---|
| Master Bedroom | Bedroom | Bath | Kitchen | Dining | Living Room |
| 1401 outlet | 1421 outlet | 1425 outlet | 1415 outlet | 1411 switches | 1407 outlet |
| 1402 outlet | 1422 outlet | 1426 switch | 1416 outlet | 1412 outlet | 1408 outlet |
| 1403 outlet | 1423 outlet | 1427 switches | 1417 switches | 1413 outlet | 1409 outlet |
| 1404 outlet | 1424 outlet | | 1418 outlet | 1414 outlet | 1410 outlet |
| 1405 switches | 1430 switch | | | | 1431 outlet |
| 1406 outlet | | | | | 1419 switch |
| | | | | | 1420 outlet |

| | | |
|---|---|---|
| Room #1 | | |
| 1425 | outlet | determined by ambient light sensing |
| 1426 | switch | determined by ambient light sensing |
| 1427 | switches | determined by ambient light sensing |
| Room #2 | | |
| 1401 | outlet | determined by ambient light sensing |
| 1402 | outlet | determined by ambient light sensing |
| 1403 | outlet | determined by ambient light sensing |
| 1404 | outlet | determined by ambient light sensing |
| 1405 | switches | determined by ambient light sensing |
| 1406 | outlet | master device is 1405 |
| Room #3 | | |
| 1421 | outlet | determined by ambient light sensing |
| 1422 | outlet | determined by ambient light sensing |
| 1423 | outlet | determined by ambient light sensing |
| 1424 | outlet | determined by ambient light sensing |
| 1430 | switches | determined by ambient light sensing |
| Kitchen | | |
| 1415 | outlet | Oven |
| 1418 | outlet | Refrigerator |
| Room #4 | | |
| 1407 | outlet | determined by ambient light sensing |
| 1408 | outlet | determined by ambient light sensing |
| 1409 | outlet | determined by ambient light sensing |
| 1410 | outlet | determined by ambient light sensing |
| 1411 | switches | determined by ambient light sensing |
| 1412 | outlet | master device is 1411 |
| 1413 | outlet | determined by ambient light sensing |
| 1424 | outlet | determined by ambient light sensing |
| 1416 | outlet | determined by ambient light sensing |
| 1417 | switches | determined by ambient light sensing |
| 1419 | switch | determined by ambient light sensing |
| 1420 | outlet | determined by ambient light sensing |
| 1431 | outlet | master device is 1411 |

SYSTEMS, DEVICES, AND METHODS FOR MAPPING DEVICES TO REALIZE BUILDING AUTOMATION AND ENERGY MANAGEMENT

FIELD OF THE INVENTION

The present disclosure is generally directed to systems, devices, and methods for automation and energy management. More particularly, the present disclosure is directed to determining the logical address and/or physical location of one or more energy consumption devices and control devices.

BACKGROUND OF THE INVENTION

Conventional automation systems have been available in the marketplace for many years. For example, the internationally-known X10 standard was one of the first standards commercialized for automating systems within a home, office, school, or other structure. The X10 standard enables commands to be sent over the existing wiring in a structure, so that a controller can send messages to a controlled device. That is, one or more devices may communicate with one another over existing electrical wiring using the X10 standard. Existing X10 standard devices generally require a user to manually set an address on each switch and outlet of a system, wherein a switch with a given address supplies or terminates power to a corresponding outlet pre-set with the identical address.

Recent efforts to conserve energy have sparked additional interest in home automation. The existing and available solutions in the prior art, however, may require large expenditures of capital and/or expert domain knowledge to facilitate installation. Existing technologies are further limited by the fact that conventional outlets function in the same way regardless of the load (e.g., the particular electronic device) operably coupled to the outlet. In other words, a conventional outlet functions exactly the same regardless of whether a refrigerator, a clock radio, an incandescent light bulb, a vacuum cleaner, a life support device, or another electronic device is plugged into the outlet. Such inflexible and non-discriminatory outlet set-up is not cost efficient, and does not optimize energy conservation.

Automation systems may provide information on the use of energy and/or other resources, such as statistics about the relative energy consumption of different locations and devices. To facilitate capturing the statistics, the system must be aware of the physical and/or logical locations of the different components connected to the system, e.g., where the components are located with respect to one another. Existing methods of capturing location information include equipping all components with Global Positioning System (GPS) equipment or similar technology, which can add significant cost to each device. It is also possible to have a skilled technician meticulously program the location of each device into a database, which is time consuming and requires special training that likewise can increase the cost of the system.

Thus, there remains a need for improved and cost-effective methods and systems for mapping components of an automation system.

SUMMARY OF THE INVENTION

The present disclosure is generally directed to systems and methods of mapping components of an automation system. More particularly, the present disclosure includes systems, devices, and methods for intelligently controlling one or more energy-consuming devices and/or other components in a structure such as a residential, commercial, or industrial building.

In one embodiment, the present disclosure includes a method of identifying a location of at least one component of an automation system, comprising: obtaining an image of the at least one component, the image being captured by a wireless device; determining a location of the wireless device at the time of capturing the image; determining an identity of the at least one component; and associating the identity of the at least one component with the location.

Various embodiments of the method may include one or more of the following features: wherein the image is captured by a camera in the wireless device, and determining the location of the wireless device includes determining one of orientation and cardinal direction of the camera at the time of capturing the image; wherein the wireless device is in communication with the automation system; wherein determining the identity of the at least one component includes analyzing a power consumption characteristic of the at least one component; wherein the identity of the at least one component is determined by activating the at least one component; wherein the at least one component is activated more than once; wherein determining an identity of the at least one component includes monitoring a change in state of the at least one component; wherein the identity of the at least one component includes an electronic identity; wherein determining the identity of the at least one component includes analyzing an electrical noise generated by the at least one component; wherein the automation system includes a power monitor in communication with the at least one component, and the power consumption characteristic is determined from the power monitor; wherein determining the identity of the at least one component includes identifying the component by physical appearance; wherein determining the identity of the at least one component includes transmitting a signal from the wireless device to the at least one component; wherein the at least one component includes a switch, an outlet, an appliance, or a combination thereof; wherein the at least one component includes an outlet and determining the identity of the outlet includes activating a load connected to the outlet; wherein the load includes an appliance; wherein the automation system includes a plurality of components in communication with one another; generating a map of a structure including the automation system; wherein the map provides the identity and location of each component of the plurality of components; wherein generating the map includes drawing a virtual wall to represent the location of each component of the plurality of components; determining a location association among at least two components of the plurality of components; wherein the at least two components are in communication with a sensor and the location association is determined from the sensor; wherein the sensor detects one of light, sound, motion, energy-use, moisture, or any combination thereof; or wherein each of the at least two components is in communication with a different sensor, and the location association is determined from the sensors.

In another embodiment, the present disclosure includes a method of mapping the physical location of components of an automation system, comprising: identifying at least one component of a plurality of components of the automation system, including: obtaining an image of the at least one component, the image being captured by a wireless device, the device having a location; identifying the at least one component in the picture; and associating the at least one component with the location; recording the location of the at least one component; and generating a map based on the location of the at least one component.

Various embodiments of the method may include one or more of the following features: wherein identifying the at least one component further includes activating the component; wherein the at least one component includes an outlet and identifying the outlet includes activating a load connected to the outlet; wherein identifying the at least one component includes determining an energy use characteristic of the component; wherein the plurality of components are in communication with one another; identifying each component of the plurality of components; determining a location association among at least two components of the plurality of components; wherein the at least two components are in communication with a sensor and the location association is determined from the sensor; wherein the at least one sensor detects one of light, sound, motion, energy-use, moisture, or any combination thereof; wherein recording the location of the at least one component includes drawing a line to represent a wall where the component was pictured; wherein recording the location of the at least one component further includes extending the line to intersect an adjacent line; wherein the line is extended to a predetermined length; wherein at least a portion of the line is deleted based on location information provided by the wireless device; wherein the plurality of components includes a first component and a second component, the method comprising identifying each of the first component and the second component, recording the location of the first component and the second component, and generating a map based on the locations of the first component and the second component, wherein the map includes at least one wall segment determined based on the locations of the first component and the second component; wherein identifying the first component and the second component includes obtaining an image of each component from a wireless device, the wireless device having a location for each image, identifying the first component and the second component in the respective images; and associating the first component and the second component with the location of the wireless device when obtaining each image; or wherein the at least one wall segment includes two wall segments determined based on the locations of the first component and the second component, respectively.

In another embodiment, the present disclosure may comprise an automation system with a control unit, one or more remote switches, and one or more remote outlets. The remote outlets monitor power consumed by appliances plugged into the outlets, and the system makes a determination about the appliances. Based on characteristics of the power consumption of the appliances, the system may make a determination about the usage of the room in which the appliances are located.

Embodiments of the present disclosure are directed to systems, devices, and methods for intelligently controlling one or more energy consuming devices in a structure, including, but not limited to, a home, office, hospital, sporting complex, or school.

Various embodiments of the automation system may include one or more of the following features: an outlet including an adaptor configured to be operably coupled with a preexisting electrical outlet; at least one sensor, e.g., a plurality of sensors; the at least one sensor may include one of a motion sensor, light sensor, and a temperature sensor; the outlet may include a microprocessor; one of the control unit and microprocessor may be configured to receive power consumption data for one or more electrical devices from a power monitor; one of the control unit and microprocessor may be configured to compare the received power consumption data to power consumption data of known electrical devices; one of the control unit and microprocessor may be configured to identify the one or more electrical devices based on the comparison of the received power consumption data to power consumption data of known electrical devices; the at least one outlet may be configured to detect an electrical noise in a power line generated by the one or more electrical devices; the at least one outlet may be configured to communicate the detected electrical noise to the control unit; the control unit may be configured to compare the detected electrical noise to electrical noise data of known electrical devices; the control unit may be configured to identify the one or more electrical devices based on the comparison of the detected electrical noise to electrical noise data of known electrical devices; the sensor may be configured to detect a radiofrequency signal; a switch operably coupled to the controller and the outlet; the control unit may be configured to communicate with the Internet; the communication link may be configured to allow wireless communication between the outlet and the control unit; and the control unit may be configured to terminate delivery of electrical energy to the at least one outlet based on an input from the at least one sensor.

It may be understood that both the foregoing general description and the following detailed description are exemplary and explanatory only, and are not restrictive of the disclosure, as claimed. The present invention will be more clearly understood from the detailed description below in conjunction with the accompanying drawings.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

FIGS. 4A-4D schematically illustrate an exemplary method, in accordance with an embodiment of the present disclosure.

FIG. 15 shows a table of exemplary data generated in accordance with an embodiment of the present disclosure.

FIG. 16 shows a table of exemplary data generated in accordance with an embodiment of the present disclosure.

DETAILED DESCRIPTION

Figure 1:
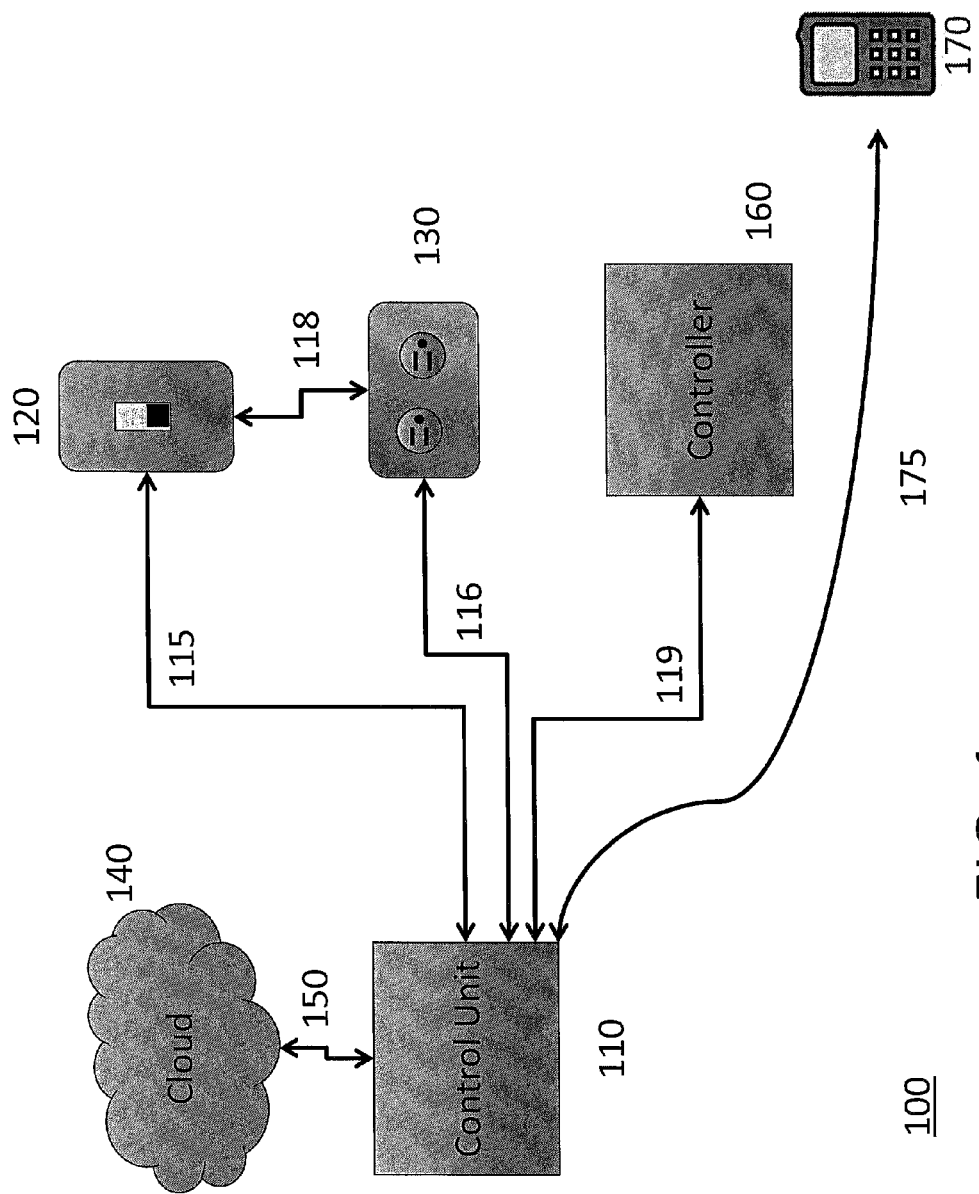
FIG. 1 schematically illustrates an exemplary automation system, in accordance with an embodiment of the present disclosure.

Reference now will be made in detail to embodiments of the present disclosure, examples of which are illustrated in the accompanying drawings. Wherever possible, the same reference numbers will be used throughout the drawings to refer to the same or like parts and/or components.

Overview

An automation system, e.g., a home automation system, may include one or more switches and one or more outlets, with the user desiring which outlet or outlets are controlled by the switch(es). Existing X10 devices require the user to manually set an address on the switch and the outlet, an outlet would respond to a switch with an identical address enabling or disabling power to the outlet on command of the identically addressed switch.

Embodiments of the present disclosure include, among other things, an automation system. Examples of suitable systems include those described in U.S. application Ser. No. 13/672,534, filed Nov. 8, 2012, the entire disclosure of which is incorporated by reference herein. Systems according to the present disclosure may be used in, e.g., residential, commercial, and/or industrial structures. Non-limiting examples include single-family and multi-family dwellings, condominium units, apartments, apartment buildings, offices, office buildings, schools, churches, sporting complexes, shopping centers, and manufacturing facilities.

The present disclosure allows a user to map (e.g., obtain, determine, or create logical and physical identifying information) and control one or more of the components of an automation system with a device, such as a mobile or wireless device. For example, the user may use the mobile device to take a picture of each component and record its location, which may be used to draw a line defining a virtual wall through the component. Activating the component pictured, for example, entering information into an user interface, turning a device partially on or partially off, etc, may provide energy use characteristics and/or other identifying information that can be used to associate the component's identity with its location. One of ordinary skill in the art would understand that activating the component in certain situations refers to activating a switch if the component is a switch, activating a load if the component is an outlet, and turning on an appliance if the component is attached to an appliance. Piecing together line segments for all the components of a given system may be used to generate a blueprint or map of the structure with which the system is disposed.

The present disclosure may be further understood with reference to embodiments shown in FIGS. 1-17. In one embodiment shown in FIG. 1, for example, the automation system 100 includes at least one outlet 130, which can be locally or remotely controlled. The outlet 130 may be configured to monitor the power consumed by one or more devices (e.g., appliances) connected thereto and/or control power delivered by the outlet 130. The system 100 further includes a switch 120, which may send a signal (e.g., a wireless signal) to a control unit 110. The control unit 110 may also be locally or remotely controlled and may include, for example, a computer with a microprocessor, memory, and user interface. The control unit 110 may be a discrete control unit, such as, e.g., a laptop, desktop, tablet, or any other suitable device. The control unit 110 may be connected via wired or wireless network connection 150 to the Internet cloud 140. The control unit 110 may be also connected to the switch 120 via wired or wireless connection 115, and further connected to the outlet 130 via wired or wireless connection 116. Similarly, the switch 120 may be connected to the outlet 130 via wired or wireless connection 118.

The system 100 may include other components or enhancements. Further, referring to FIG. 1, the automation system 100 may include a controller 160 that can control (e.g., adjust, open, close) window coverings. Controller 160 may be also configured to control other systems or enhancements associated with a home, office, school, or other structure. For example, controller 160 may control systems for irrigation, heating and cooling, entertainment, and/or water heating. In addition, controller 160 may control one or more safety systems. In the embodiment where controller 160 may control window treatments, the controller 160 receives instructions from the control unit 110 via wired or wireless connection 119. The switch 120 may also communicate with the controller 160 via wired or wireless means (not shown). The wired or wireless connections 115, 116, 118, and 119 may use the same or different protocols or standards. In addition to instructions being processed by control unit 110, some or all of the processing could be performed by one or more microprocessors included in the switch 120 or the outlet 130. It is understood that the system 100 may include multiple switches 120, outlets 130, and/or controllers 160, e.g., window control units. Other devices such as moisture sensors maybe attached to the system 100 to provide information on the presence of water or rain. The outlet 130, switch 120, control unit 110, and controller 160 may include one or more features of the outlet, switch, control, and controller described in U.S. application Ser. No. 13/672,534, filed Nov. 8, 2012, which is incorporated herein by reference.

A mobile device 170 may be wirelessly connected to the system 100 via wireless connection 175. For example, the mobile device 170 may be connected to the control unit 110 as shown in FIG. 1, or may also be connected to the outlet 130, controller 160, switch 120, or any combinations thereof. The mobile device 170 includes a wireless transceiver, which provides means to measure received signal strength. The mobile device may include any suitable means of collecting, recording, analyzing, and/or transmitting data in order to locate, characterize, and/or otherwise identify devices and components of an automation system. In some embodiments, for example, the mobile device 170 includes an imaging device, e.g., a camera, for taking and transmitting pictures. The mobile device 170 may also include means for determining location and/or orientation information. Non-limiting examples of such technology include GPS, accelerometers, compasses, and gyroscopes. The mobile device 170 may collect data to determine the orientation of the camera when taking a picture, e.g., whether the camera is pointed towards a ceiling, a floor, or a wall. The geographic location and cardinal direction of the camera may also be determined via a compass, GPS, and/or other suitable data collected by the mobile device 170. In addition to instructions being processed by control unit 110, some or all of the processing could be performed by mobile device 170.

Figure 2:
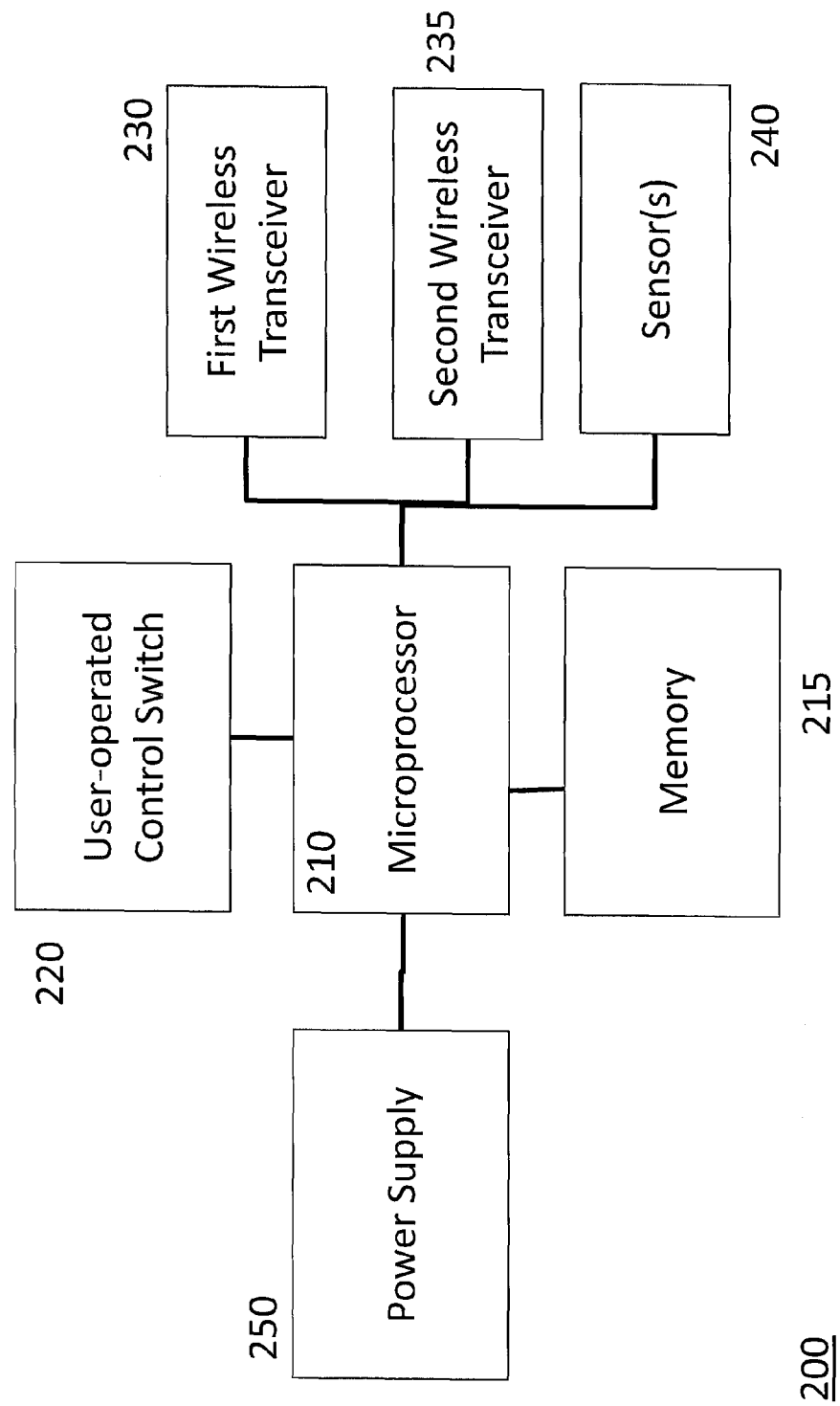
FIG. 2 schematically illustrates an exemplary switch, in accordance with an embodiment of the present disclosure.

FIG. 2 is a block diagram for a switch 200 that may be used in the automation system 100 and may operate as the switch 120 in FIG. 1. In at least some embodiments, the switch 200 is remotely controlled. The switch 200 includes a microprocessor 210 capable of running software or an algorithm stored in memory 215. Memory 215 may be any suitable solid state or flash memory. The switch 200 may include a user-operated portion 220, which may be a mechanical light switch, or any of various user input devices such as a touch sensor or push buttons. User-operated portion 220 may be configured to control (e.g., interrupt, adjust, change, terminate and/or meter) the supply of electrical energy to a device or electrical outlet (e.g., outlet 130 shown in FIG. 1) in communication with switch 200. Accordingly, in one embodiment, the user-operated control portion 220 may be configured to transition between an "on" position and an "off" position. In another embodiment, the switch may allow various levels to be indicated by the user discretely or continuously.

The switch 200 may further include a first wireless transceiver 230, for example an 802.11 Wi-Fi transceiver. The term "transceiver" as used herein should not be construed as limited to any particular structural components. Instead, a transceiver may include any structural components configured to allow for back and forth communication. Accordingly, the transceivers disclosed herein may include, but are not limited to, antennae, power supplies, communication ports, and any other elements needed to achieve the desired function. The first wireless transceiver 230 may be configured to communicate over any known protocol including, but not limited to, X10, Zigbee®, and/or Bluetooth. Further, although the exemplary embodiment of FIG. 2 depicts the transceiver 230 as a wireless transceiver, those of ordinary skill will readily recognize that first wireless transceiver 230 may be replaced with a wired communication mode. First wireless transceiver 230 may allow the switch 200 to communicate with a control device, e.g., the control unit 110 as shown in FIG. 1. The first wireless transceiver 230 therefore may allow the switch 200 to exchange commands with the control unit 110 of the automation system 100.

In some embodiments, the switch 200 may also include a second wireless transceiver 235 to allow the switch 200 to communicate with one or more devices (e.g., the outlet 130 shown in FIG. 1 or any electrical load coupled thereto) using multiple standards. Both transceivers 230 and 235 may include received signal-strength indicator means to identify the strength of a signal received by the transceiver. The first and second wireless transceivers 230, 235, respectively, may allow for communication over one or more protocols. In addition, the first wireless transceiver 230 may be configured to communicate over a protocol that is different from the communication protocol of the second wireless transceiver 235.

The switch 200 may include one or more sensors 240 configured to detect and respond to various conditions or stimuli, such as temperature, moisture (e.g., water, rain, or humidity), light, sound, air flow, contaminants, motion, or electromagnetic or radio frequencies. Examples of such sensors are disclosed in U.S. application Ser. No. 13/672,534, which is incorporated herein by reference. The switch 200 may also include a power supply 250, which may be any suitable power supply known in the art. In some embodiments, for example, the power supply 250 includes a battery, e.g., a rechargeable battery. It is understood that the power supply 250 in FIG. 2 may schematically illustrate a wired or wireless connection to a power network, such as, e.g., a power grid or transformer. Further, the power supply 250 may include both a battery and a connection to a power network.

The switch 200 may include a microprocessor 210, which may be any suitable microprocessor known in the art. Although FIG. 2 shows the microprocessor 210 located within the switch 200, the microprocessor 210 may also be remotely connected to the switch 200. The microprocessor 210 may be configured to communicate, e.g., exchange control signals, with the one or more sensors 240, the first wireless transceiver 230, the second wireless transceiver 235, and/or the user-operated portion 220.

Figure 3:
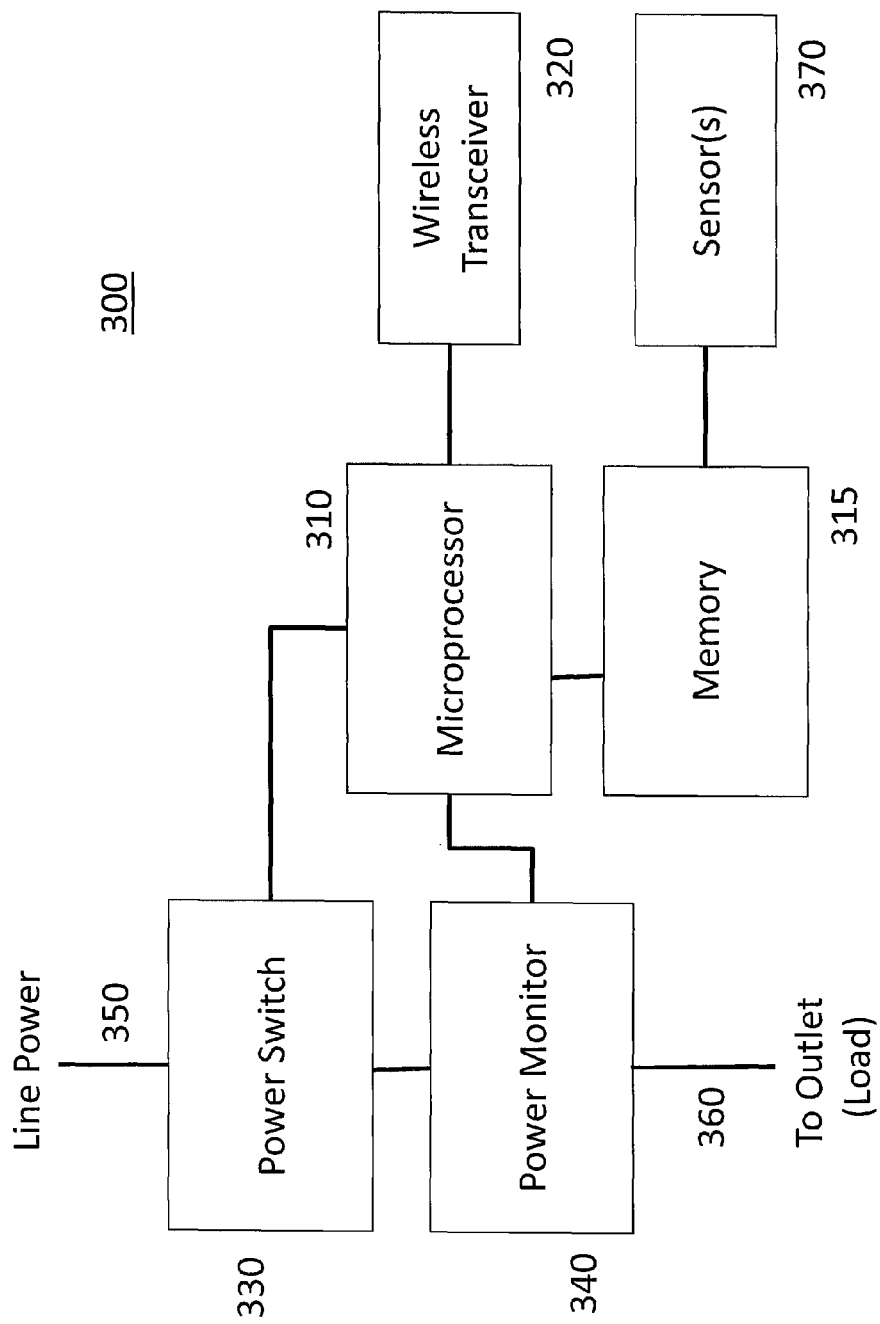
FIG. 3 schematically illustrates an exemplary outlet, in accordance with an embodiment of the present disclosure.

FIG. 3 shows a block diagram of an outlet 300 that may operate as the outlet 130 of the system 100 shown in FIG. 1. In at least some embodiments, the outlet 300 is remotely controlled. The outlet 300 includes a microprocessor 310 that runs software or an algorithm stored in memory 315. The microprocessor may be remote. The outlet 300 further includes a transceiver 320, which may include any of the features described in connection with transceivers 230 and 235 of FIG. 2. The outlet 300 may also include one or more sensors 370, which can include motion sensors, ambient light sensors, a camera, a microphone, moisture sensors, or any of the sensors described above with respect to the one or more sensors 240 of FIG. 2.

In some embodiments, the outlet 300 receives electrical energy via a power switch 330 supplied by line power via connection 350. The power switch 330 may be controlled by a microprocessor, e.g., 310, which may include any or the features described with respect to the microprocessor 210 of FIG. 2. The power switch 330 may be configured to connect or disconnect the line power to the outlet 300, including a connected load 360 (e.g., one or more electrical devices coupled to the outlet 300). The power switch 330 may also be configured to reduce a voltage or current delivered to the load 360, thus providing a dimming function.

The outlet 300 may further include a power monitor 340 for measuring the consumption of power by the load 360 connected to the outlet 300. The load 360 may be connected via any suitable means, such as, e.g., standard 2 or 3 pin power outlets, 220V outlets, or international standard outlets, and may also include a wireless connection such as via a wireless charger. The power monitor 340 may transmit measured power data to the microprocessor 310 via the transceiver 320, and may also transmit data to one or more other components or devices of the system 100.

In some embodiments, the power monitor 340 also measures noise in the connection to the load 360 in order to determine the type of energy-consuming device(s) connected, e.g., as explained in U.S. application Ser. No. 13/672, 534, which is incorporated herein by reference. This type of analysis is discussed in U.S. Pat. No. 8,094,034. Multiple connections throughout an entire structure may be monitored and analyzed to determine the types of devices such as appliances connected to define the load 360, e.g., by turning the devices on and off. In some embodiments, user activity may be inferred by monitoring a structure, e.g., identifying which loads are activated and deactivated. By monitoring power consumption characteristics at the outlet 300, characteristics of a device connected to the outlet 300 may be determined, e.g., via techniques disclosed in U.S. Pat. No. 8,094,034 or other analytical methods. Based on the power consumption characteristics, the device (e.g., an oven, refrigerator, or fan) may be beneficially and intelligently identified.

FIGS. 4A-4D illustrate an exemplary method 400 of the present disclosure whereby a user may generate a blueprint, drawing, or map identifying the components of an automation system, e.g., the system 100 of FIG. 1. That is, the method 400 may be used to catalogue the components and associate each with a unique physical location, as well as associate the components logically with respect to one another. The method 400 may be performed using any combination of devices and components described above, including those referenced in FIGS. 1-3. In some embodiments, for example, the method 400 may be performed using at least mobile device 170, control unit 110, and/or an Internet server via cloud 140.

Figure 7:
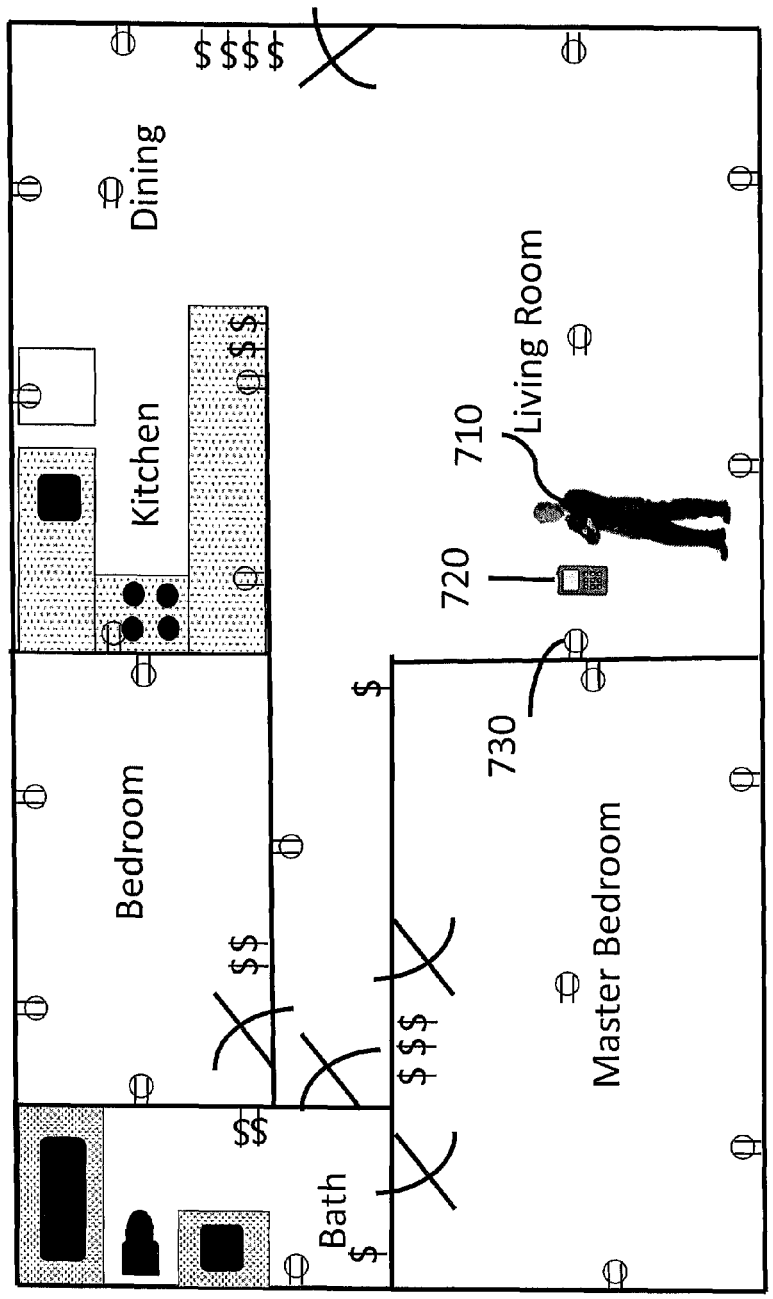
FIG. 7 shows a blueprint of a home showing a user and device, in accordance with an embodiment of the present disclosure.

As shown in FIG. 4A, a user launches an application (step 405), which may be installed on a mobile device (e.g., mobile device 170 or 720 shown in FIGS. 1 and 7, respectively). Alternatively, the user may access a website via the mobile device. The application may prompt the user to take a picture of a component of the automation system (step 410) such as, e.g., an appliance, outlet, switch, or other component. As discussed above, the mobile device may include a camera for taking pictures, and may also include other means for determining the physical location and orientation of the camera when taking the pictures. Thus, the user may take a picture of a component of the system (step 415), such as outlet 730 of FIG. 7, discussed below. The picture may be analyzed by the mobile device, or may also be transmitted, e.g., to control unit 110 and/or sent to a server in the Internet for analysis.

Next, the component shown in the picture is identified (step 420). In some embodiments, the mobile device emits a signal when taking a picture. A component of the system 100 may receive the signal, and may respond in a way that reveals the component's identity. For example, the component may receive the signal from the mobile device and transmit a message indicating a type of device, configuration, communication protocol, energy consumption, and/or other identifying information. Further, the strength of the signal emitted by the mobile device may be used to identify the component pictured. For example, the mobile device initially may emit a low-power signal. If no message is received, the mobile device may incrementally increase power and retransmit the signal until a response is received. In this manner, the mobile device may associate the first component to respond with the closest component in the picture. In some embodiments, the mobile device may also capture the electronic identity (ID) of the responding component, for example, a model, serial number, and/or other identifier of the component. If the electronic ID does not match the type of component shown in the picture (e.g., the picture shows an outlet but the electronic ID corresponds to a switch), the electronic ID will not be associated with the picture. In some embodiments the component may include a barcode or other visible label which when captured in an image by the mobile device 170 may be decoded to reveal an identity of the component. In some embodiments, the visible label may be removably attached to the component.

In step 425 of the method 400, a determination is made whether the component pictured is a switch (e.g., switch 200 of FIG. 2). If so, the user may be prompted to activate the switch (step 435) such that the system 100 monitors whether a change of state results, e.g., an increase or decrease in power drawn from a device of the automation system, or any other change in a measured sensor value. The application may prompt the user to re-activate the switch (step 440) to monitor for a second change of state. It is expected that other switches nearby may be activated at the same time. Thus, prompting the user for a first activation (step 435) and second activation (step 440) may increase the likelihood of uniquely identifying the switch in the picture. If no other switches in the system 100 are activated, however, the reactivation step 440 may not be necessary. Further, in some embodiments, control over other switches in the system 100 may be inhibited, e.g., temporarily suspended, to allow a particular switch to be uniquely identified. For example, manual control over a portion of, or all switches of system 100 other than the switch to be identified may be blocked while a user identifies the switch, e.g., activates the switch according to step 435.

In step 445, a determination is made whether the switch has been uniquely identified. If the switch is uniquely identified, the switch is associated with the camera's location when taking the picture (step 415). If the switch is not uniquely identified, the application may prompt the user to repeat steps 435 and 440. The switch may not be uniquely defined if many other switches are being activated during the mapping process. Once the switch is uniquely identified, it is mapped to the location at which the picture was taken (step 415).

Figure 4B:
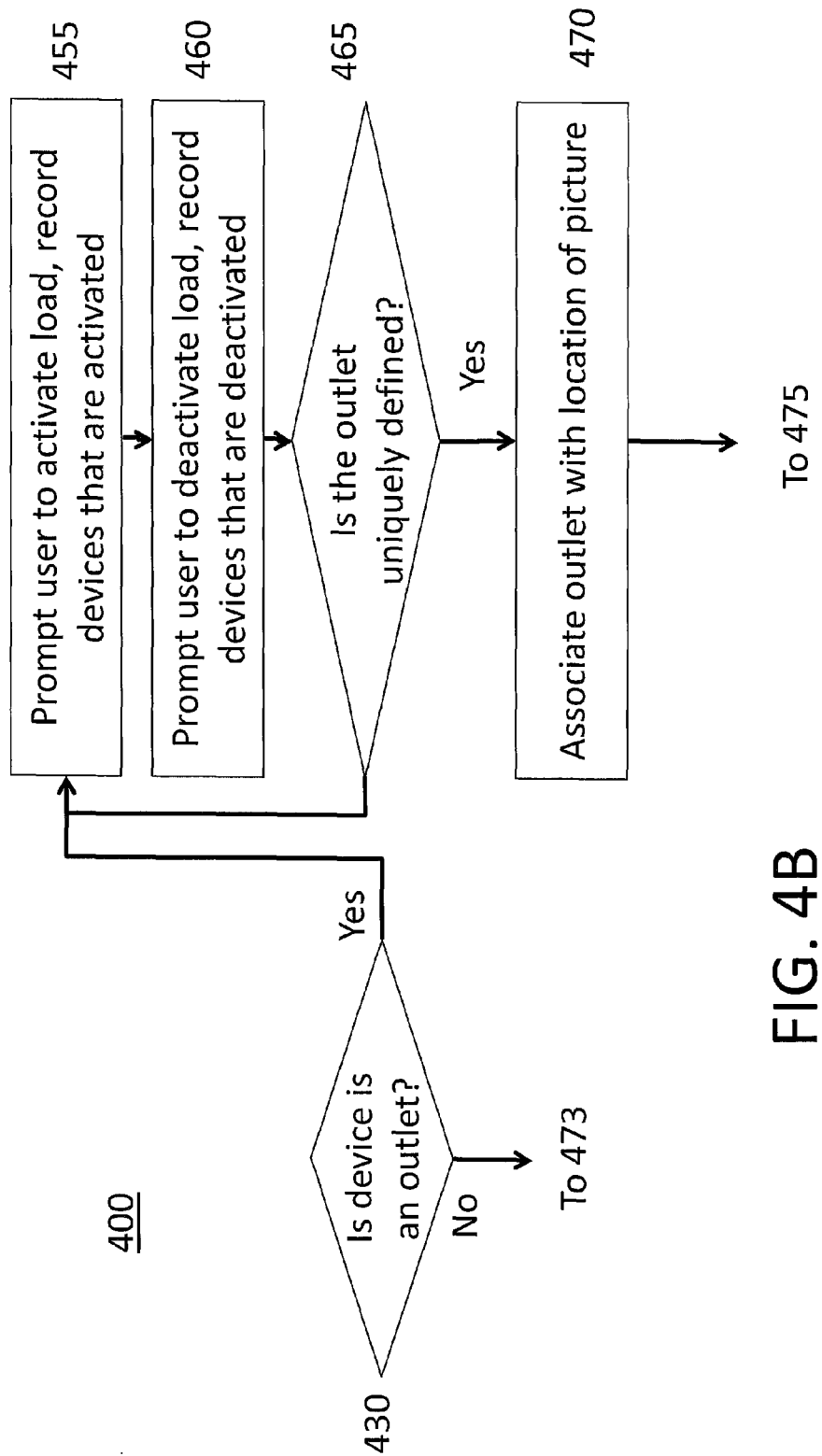

Turning to FIG. 4B and referring back to step 425, if the device is not identified as a switch, the picture is analyzed to determine whether the component is an outlet (step 430). If so, the user may be prompted to activate a load connected to the outlet (step 455). Activation may include plugging in a device such as an appliance and turning it on. The system 100 may then monitor all of the outlets for a change of state and identify an outlet drawing power upon activation of the load. The user is then prompted to deactivate (e.g., unplug or turn off) the load (step 460), and the system 100 again monitors the outlets for a change of state. In this way, the system can uniquely identify the outlet pictured.

The user may alternatively or additionally plug a test load into the outlet to help with identification. One example of a suitable test load is a GE 50542 Receptacle Tester. The test load should be chosen to draw power in a range that can be measured by the power monitor 340 of the system 100. The test load should also be unique from most other loads so that the system 100 can uniquely identify when the test load is plugged into the outlet. In some embodiments, the user may specify the load connected to the outlet. The user interface of the mobile device may present a drop-down menu to allow the user to select a device from a menu, which is then transmitted to the control unit 110.

In step 465, a determination is made whether the outlet is uniquely identified. If not, the application may prompt the user to repeat steps 455 and 460 by reactivating and deactivating the load. If the outlet is uniquely identified, the method proceeds to step 470 wherein the outlet is associated with the location of the picture previously taken in step 415.

Figure 4C:
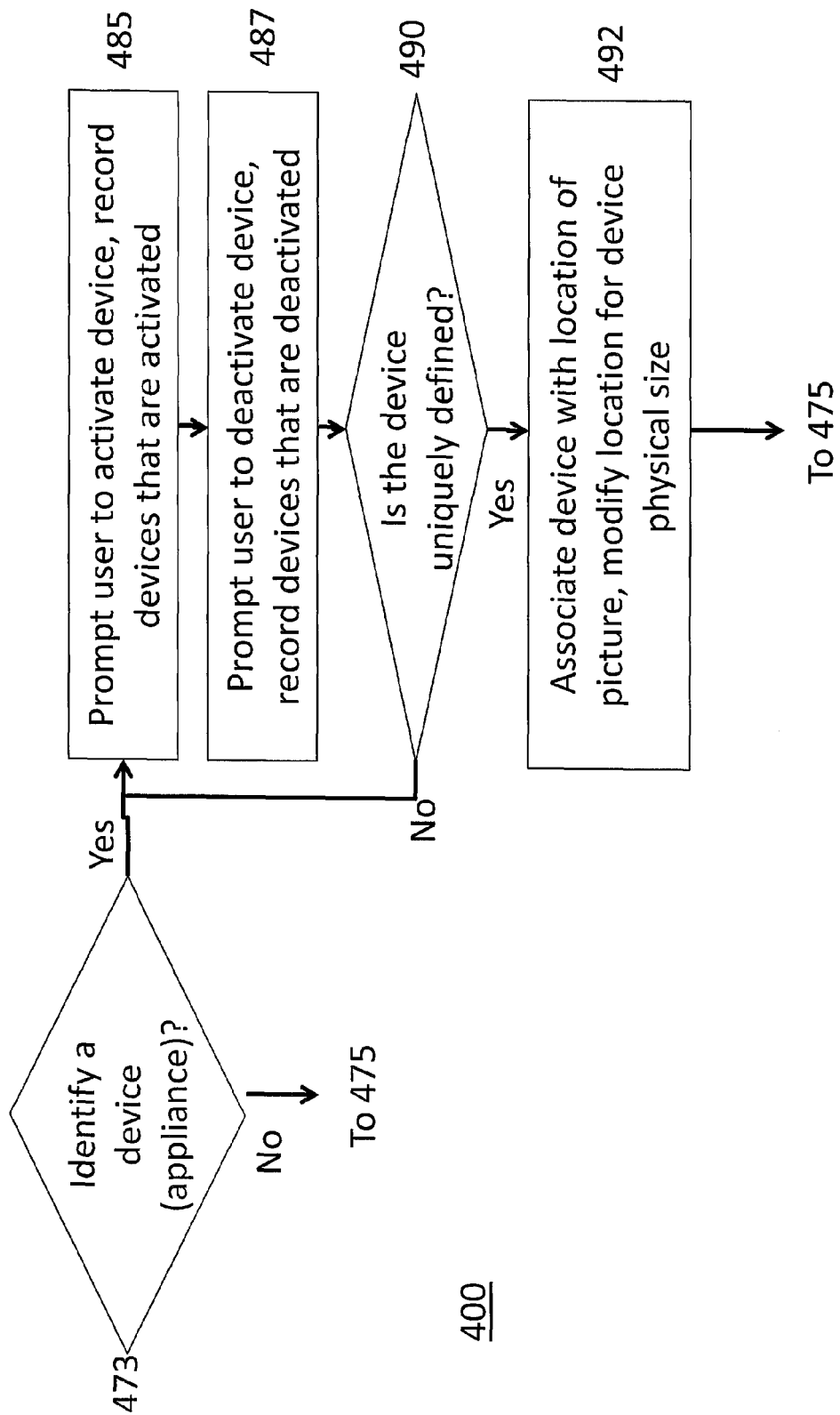

Turning to FIG. 4C and referring back to step 430, if the component pictured is not an outlet, the picture may be analyzed to determine whether the component is an appliance (step 473). For example, the component in the picture may be compared to refrigerators, ovens, stove tops, warming drawers, light fixtures, ceiling fans, or any other appliances possibly included in the system 100. As discussed above, the mobile device may include means for determining its orientation when taking the picture (e.g., whether the device is pointed to a wall, floor, ceiling, etc.) such as a gyroscope and/or accelerometer sensor. Knowing if the picture is of the ceiling or a wall can be used to reduce the number of appliances that must be searched.

If the appliance is identified, the user is prompted to turn the device on in step 485. The system 100 monitors appliances that are activated and may record characteristics of the power drawn in order to identify the appliance. The power may be monitored, for example, by the power monitor 340 of outlet 300 shown in FIG. 3. The user is prompted to deactivate the appliance while the system 100 monitors which devices have been turned off (step 487). In step 490, a determination is made whether a unique appliance has been identified that was turned on and off approximately at the times proscribed by steps 485 and 487. If not, the user may be prompted to again turn the appliance on and off for identification.

In step 492, the uniquely-identified appliance is associated with the location of the picture taken in step 415. The location may be modified by physical characteristics known about the appliance. For example, the picture taken in step 415 may show an oven that is identified in step 473 as a Kenmore built-in double oven. Information obtained via the Internet or a database can be used to determine that that the oven has a depth of about 3 feet. Thus, when the picture is associated with the oven, the location is set 3 feet from that of the mobile device to account for the depth of the oven.

After associating the appliance with its location, the user is prompted to take a picture of another component of the system 100 in step 475 Referring back to step 473, if the component pictured is not identified as an appliance, the user likewise proceeds to step 475 to determine whether any other components remain to be identified. If more pictures are to be taken, the method 400 proceeds back to step 410.

Figure 5:
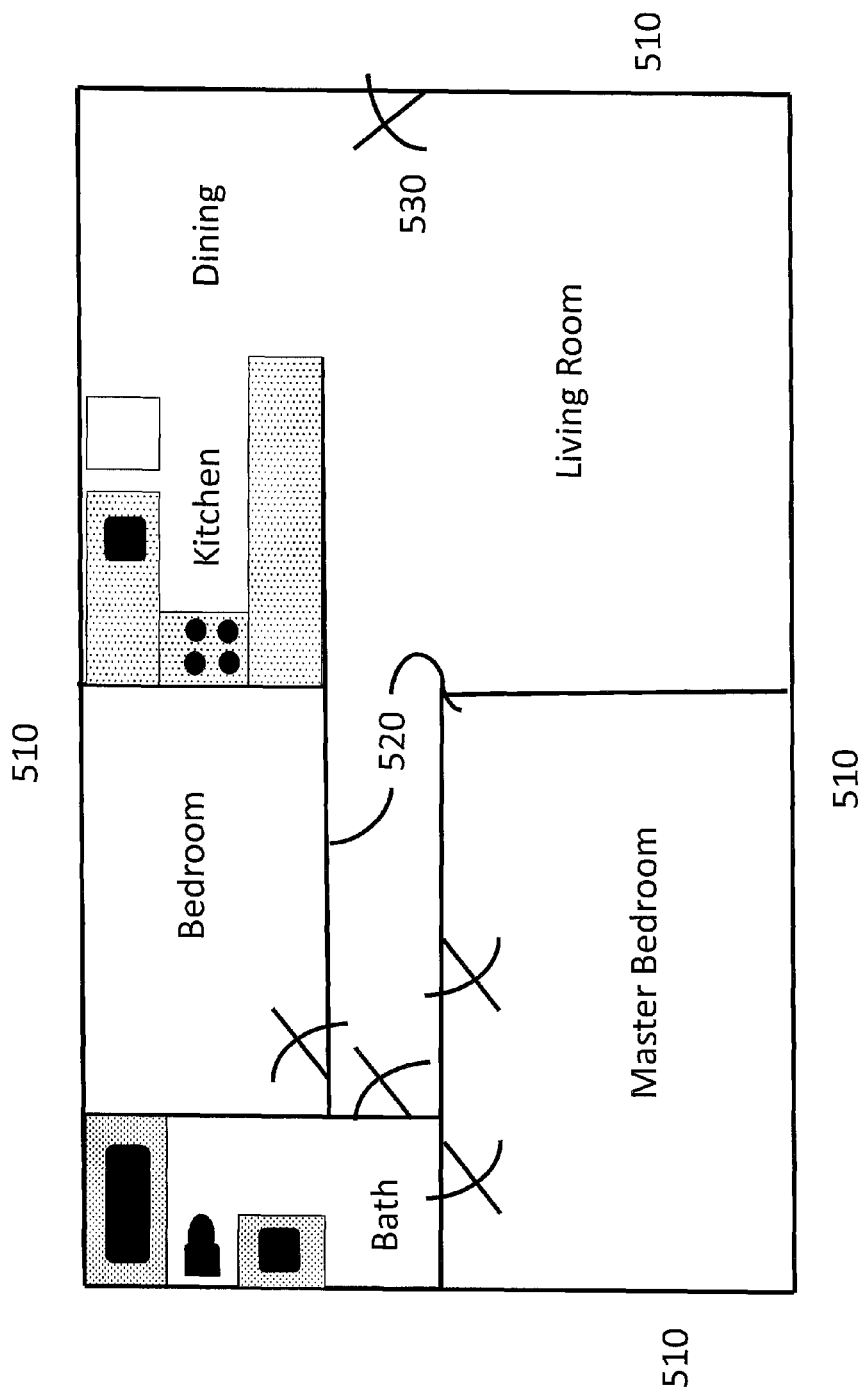
FIG. 5 shows a basic blueprint of an exemplary 2 bedroom home, in accordance with an embodiment of the present disclosure.
Figure 6:
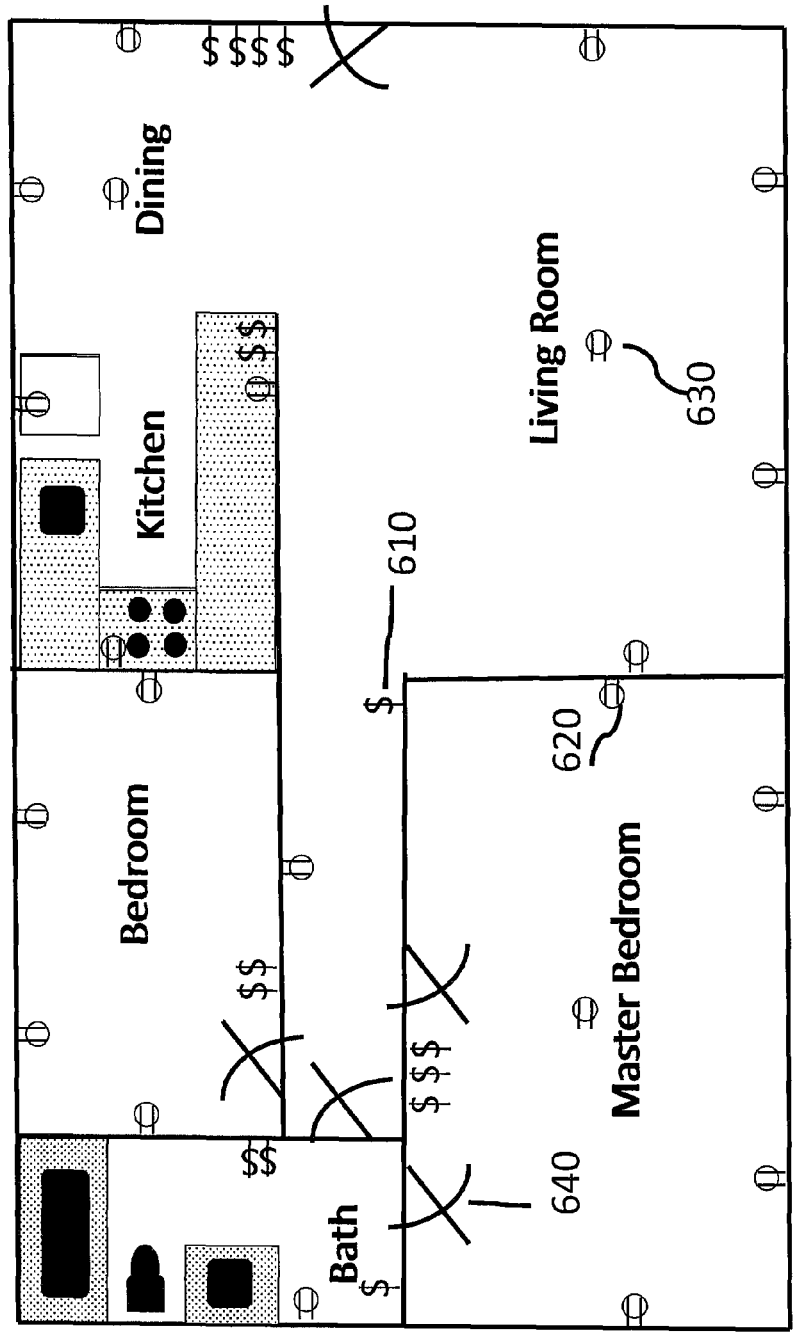
FIG. 6 shows a basic blueprint showing electrical devices, in accordance with an embodiment of the present disclosure.

The steps of method 400 illustrated in FIGS. 4A-4C may be further understood with reference to FIGS. 5-7 depicting a two-bedroom home (e.g., house, apartment or condominium) that includes an automation system 100 to be mapped according to method 400. Many people do not have readily available blueprint drawings of their dwellings, and generating one by hand or with computer tools can be prohibitively complicated. FIG. 5 shows a blueprint drawing or map 500 including exterior walls 510, interior walls 520, and doors 530. Spaces in the home may also be labeled according to their function, e.g., "Master Bedroom," "Kitchen," etc. FIG. 6 shows another blueprint drawing 600 similar to drawing 500 of FIG. 5, with the addition of system components. Drawing 600 includes, for example, switches 610, which may be, e.g., single, double, and/or multiple switches, and wall-mounted outlets 620. Drawing 600 further includes ceiling-mounted components 630 such as, e.g., outlets, light fixtures, ceiling fans, or other ceiling-mounted appliances. FIG. 7 shows yet another blueprint drawing 700 similar to drawings 500 and 600 of FIGS. 5 and 6, with the addition of a user 710 and a mobile device 720. The user 710 is located in the living room with mobile device 720, facing a wall-mounted outlet 730 to record its location.

Figure 4D:
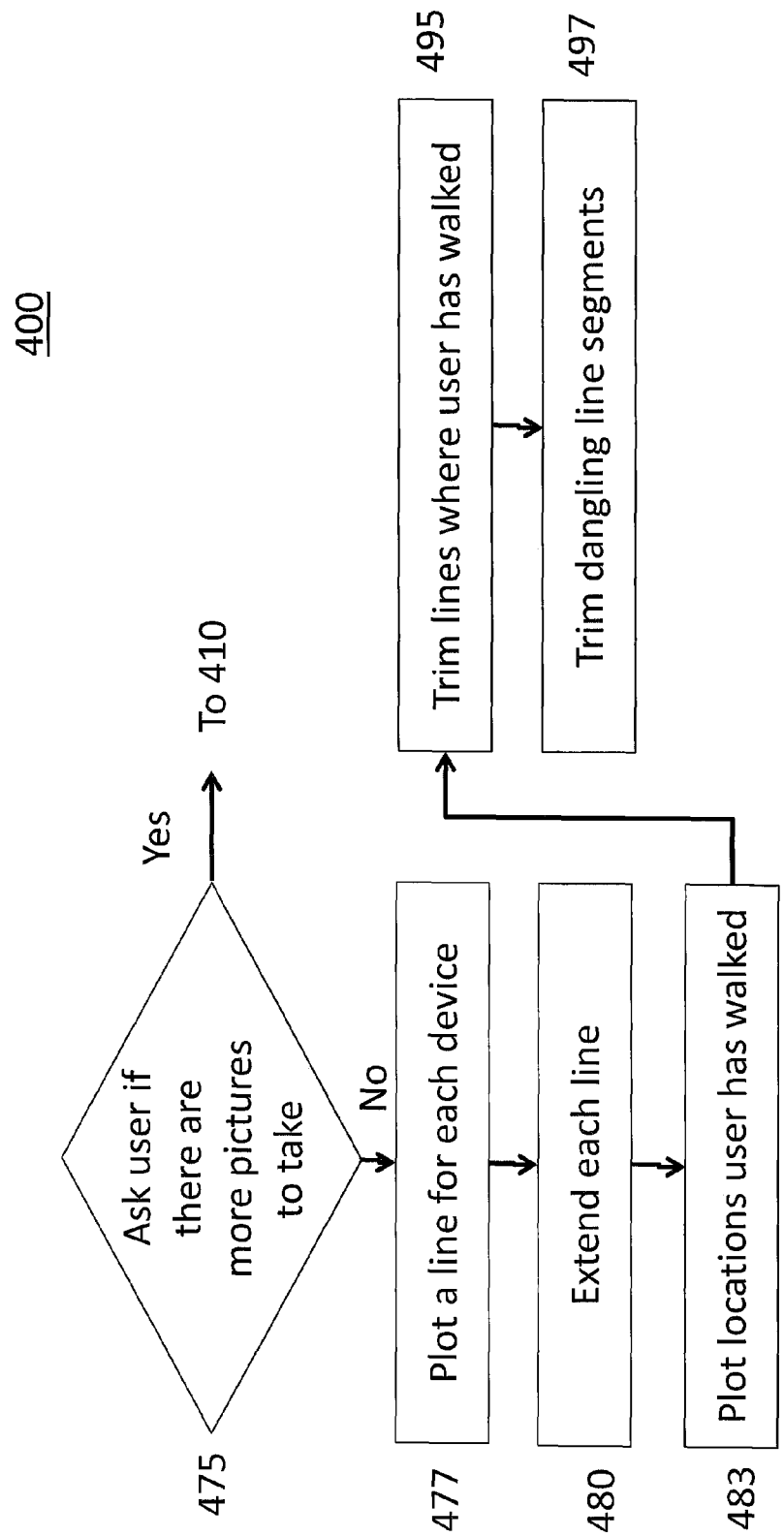
Figure 8:
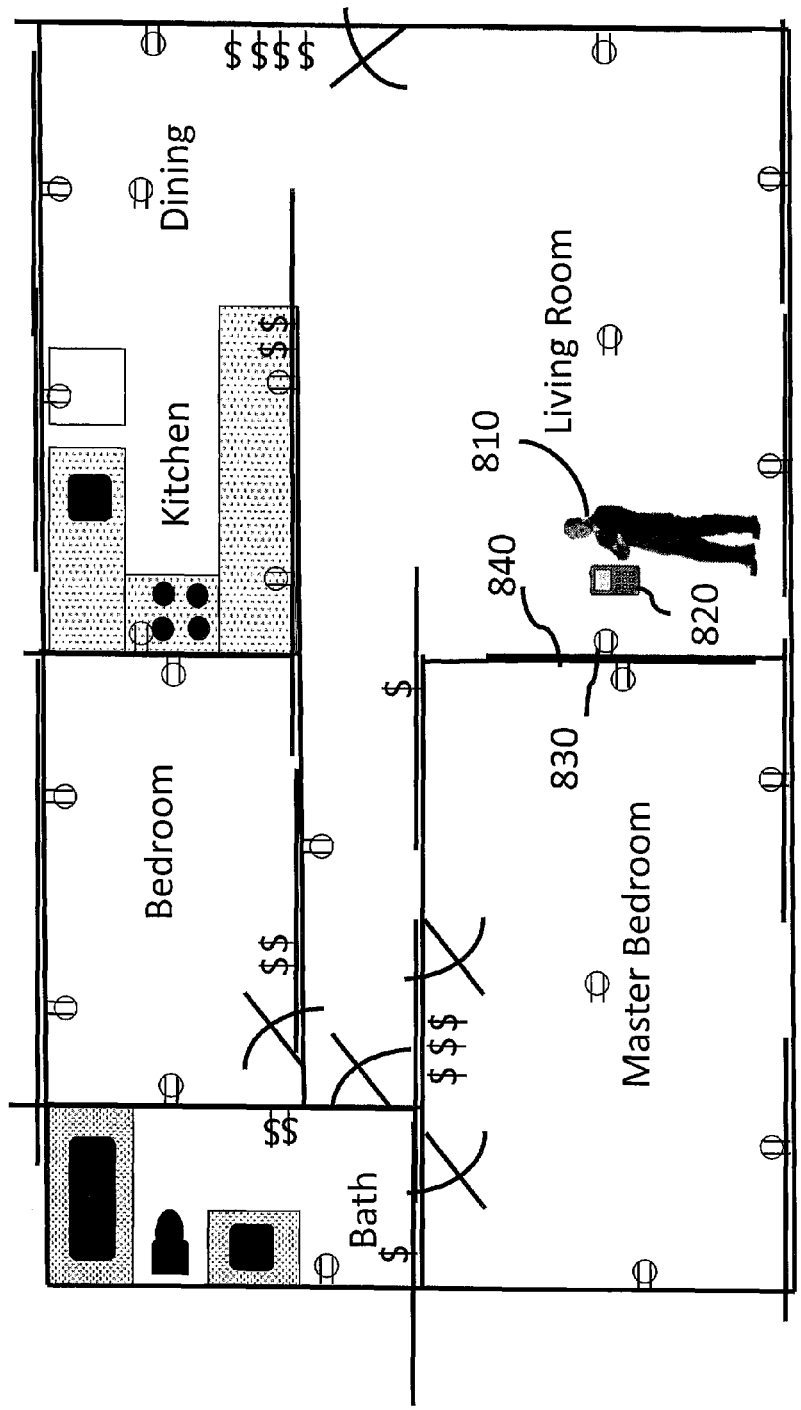
FIG. 8 illustrates an example of lines extrapolated from pictures of devices, in accordance with an embodiment of the present disclosure.
Figure 9:
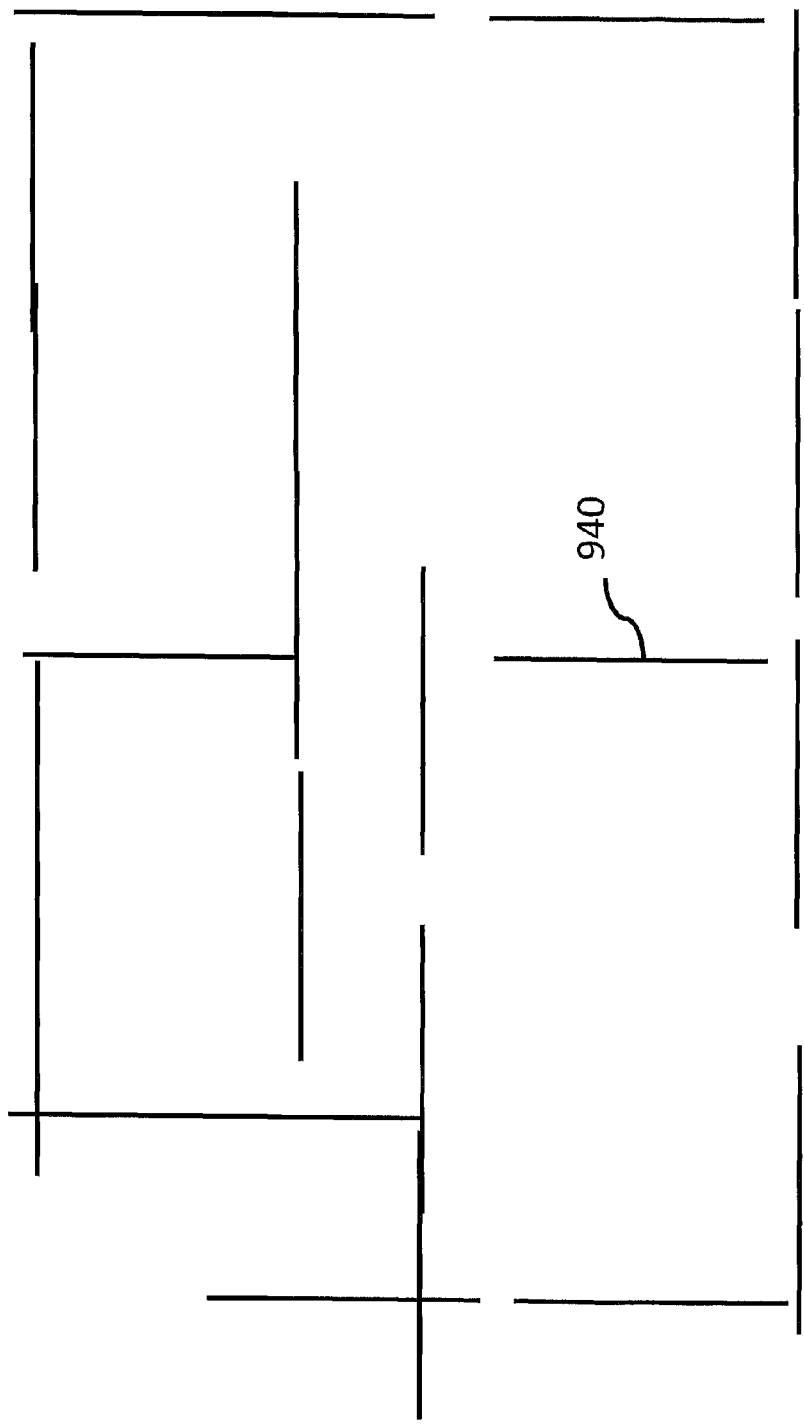
FIG. 9 shows a diagram of lines extrapolated from pictures of devices, in accordance with an embodiment of the present disclosure.

Turning to FIG. 4D and referring to step 475, if no further pictures are to be taken, a line is drawn in step 477 to represent each wall in which one or more components were pictured and identified. The line for each component is centered on the component's location recorded by the mobile device when taking the picture. The line may be set at a specified distance from the location of the mobile device, for example several inches or feet, such as, e.g., 1 foot, 2 feet, 3 feet, 4 feet, or 5 feet. The orientation of the mobile device 170 when the picture was taken may be determined from sensors in the mobile device 170 and/or other components such as an electronic compass, accelerometers, and gyroscopes. The location of the mobile device 170 when the picture was taken can be determined from GPS and/or other location technology. Based on the position and orientation data, it can be determined where the mobile device 170 was located when the picture was taken, e.g., the proximity of the mobile device 170 to the component appearing in the picture. The size of the component in the picture, focusing information, and/or other characteristics of the picture may be used to determine the distance from the mobile device 170 to the component of the automation system in order to more accurately plot lines for each component to generate a map of the system. FIG. 8 shows an example of a drawing 800 in which the user 810 located in the living room, uses mobile device 820 to take a picture of outlet 830 according to method 400. Line 840 is drawn as a result of the picture taken of outlet 830. FIG. 9 shows a plot of the different line segments that would result from pictures of all wall mounted outlets, devices, and switches in drawing 800. Line 940, for example, results from the picture taken of outlet 730 in FIG. 7 and outlet 830 in FIG. 8.

Figure 10:
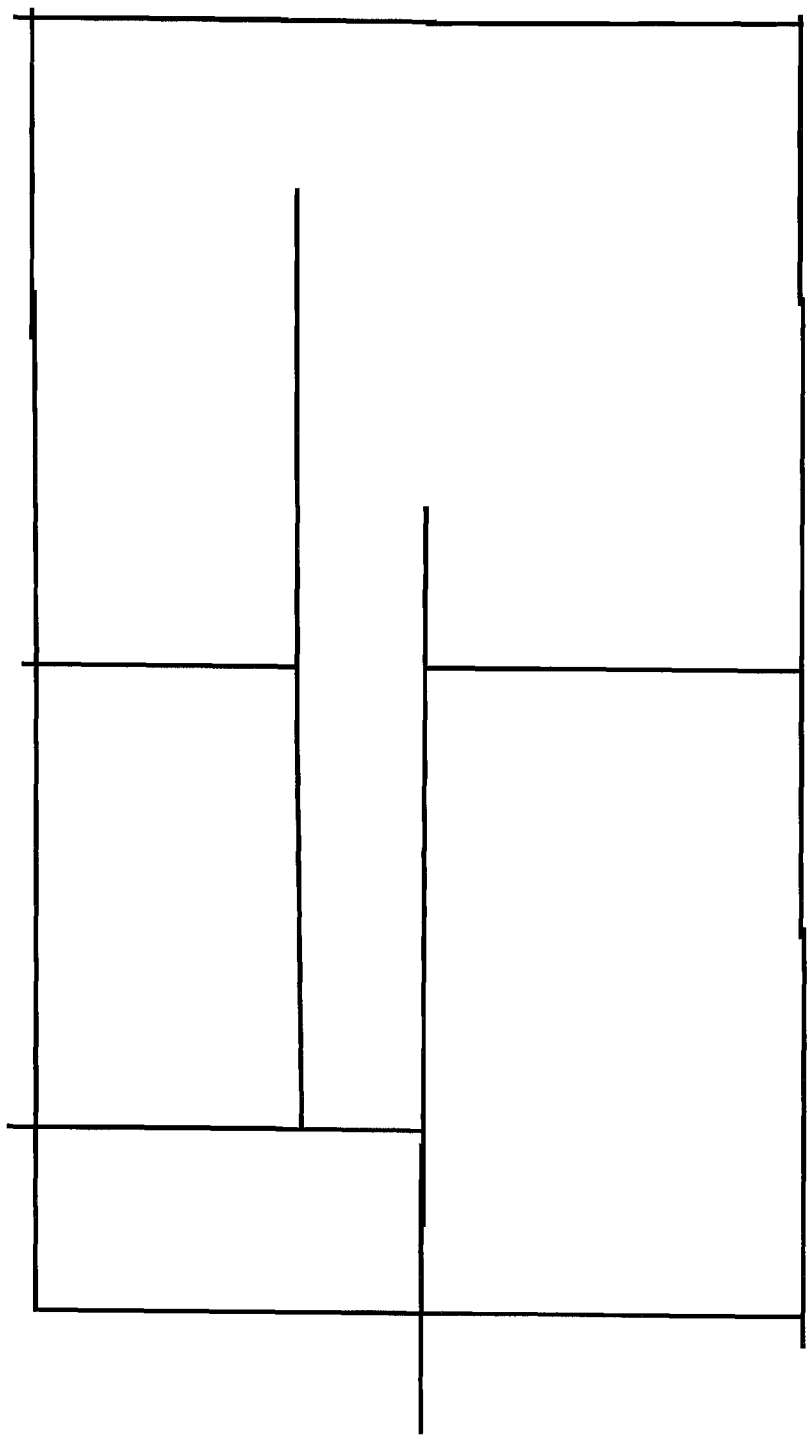
FIG. 10 shows lines with closed gaps, in accordance with an embodiment of the present disclosure.

Further referring to FIG. 4D, all the lines generated from the images captured by the mobile device may be extended (step 480) to close gaps between the lines. Each line is extended until both ends touch an adjacent line and/or until the line is extended to a specified length, e.g., about twice its length. FIG. 10 shows a drawing 1000 in which the lines have been extended according to this algorithm.

Figure 11:
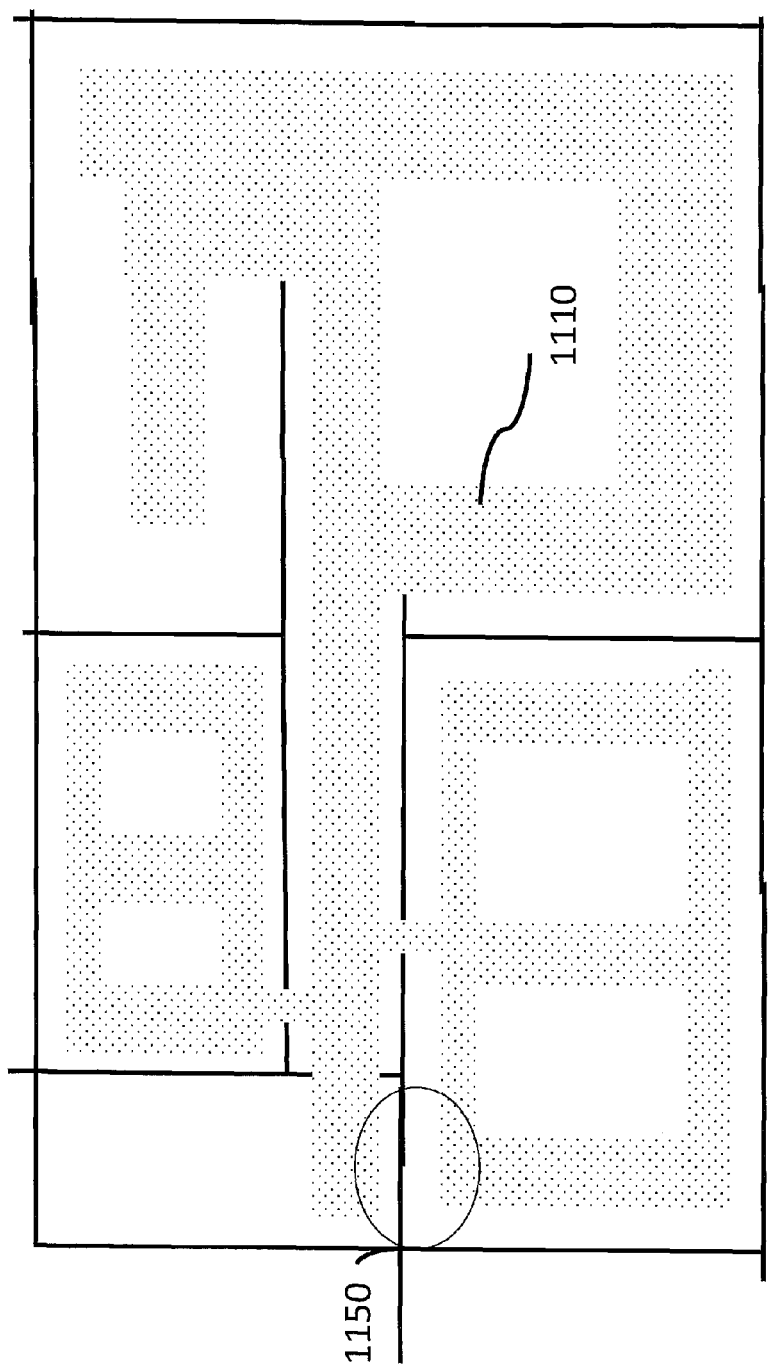
FIG. 11 shows a line drawing with overlaid walking data, in accordance with an embodiment of the present disclosure.

While the application is running, e.g., according to method 400, the mobile device records where the user finds the devices (e.g., the user's location or path of travel) to collect data for each component of the system 100. In step 483, the different locations recorded as the user has walked around the structure are plotted. FIG. 11 shows a drawing 1000 that includes a shaded area 1100 depicting all the areas the user has walked, and carried the mobile device, according to method 400 while completing the various steps of method 400 and/or while the application is running.

Figure 12:
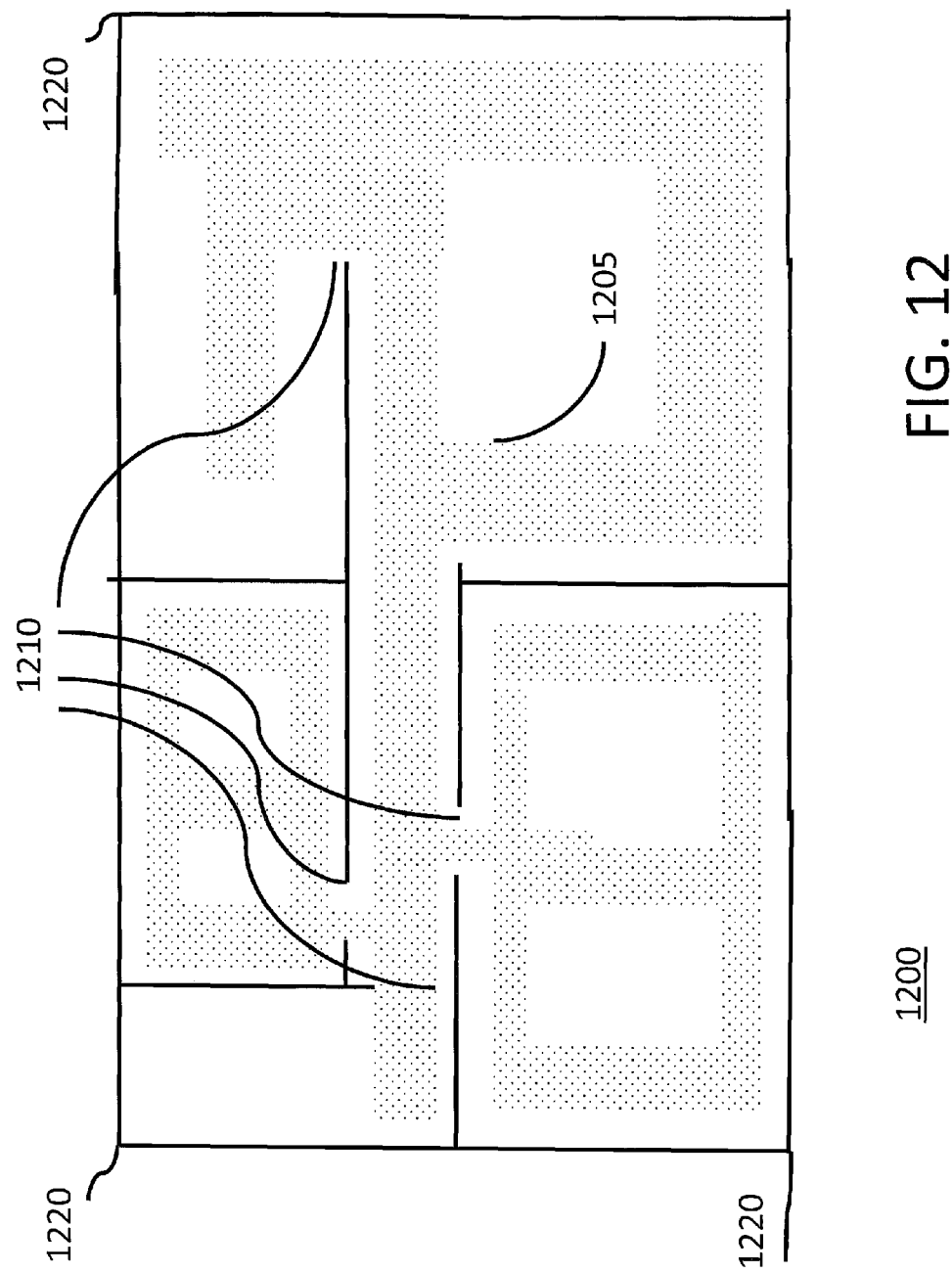
FIG. 12 shows line modifications for walking data, in accordance with an embodiment of the present disclosure.

In step 495, the lines are trimmed to account for the user's movements across lines. FIG. 12 shows shaded areas 1205 where the user has walked. Areas 1210 indicate where lines are trimmed to accommodate the shaded areas 1205 where the user has walked. In step 497 the lines on the outside walls are trimmed. This is further illustrated in FIG. 12 with outside walls 1220 trimmed to square off the drawing. Outside walls are the walls on the outer boundary of the blueprint, map, or drawing. Whether a wall is an outside wall may be determined, for example, by information from the mobile device 170. If the mobile device 170 is taking pictures of fixtures or outlets outside the structure, the mobile device 170 may measure the temperature, humidity, and/or use other sensor input to ascertain that the mobile device 170 is outside. Whether a component is located outside or inside a structure may be recorded with location information stored with the picture of the component.

Figure 13:
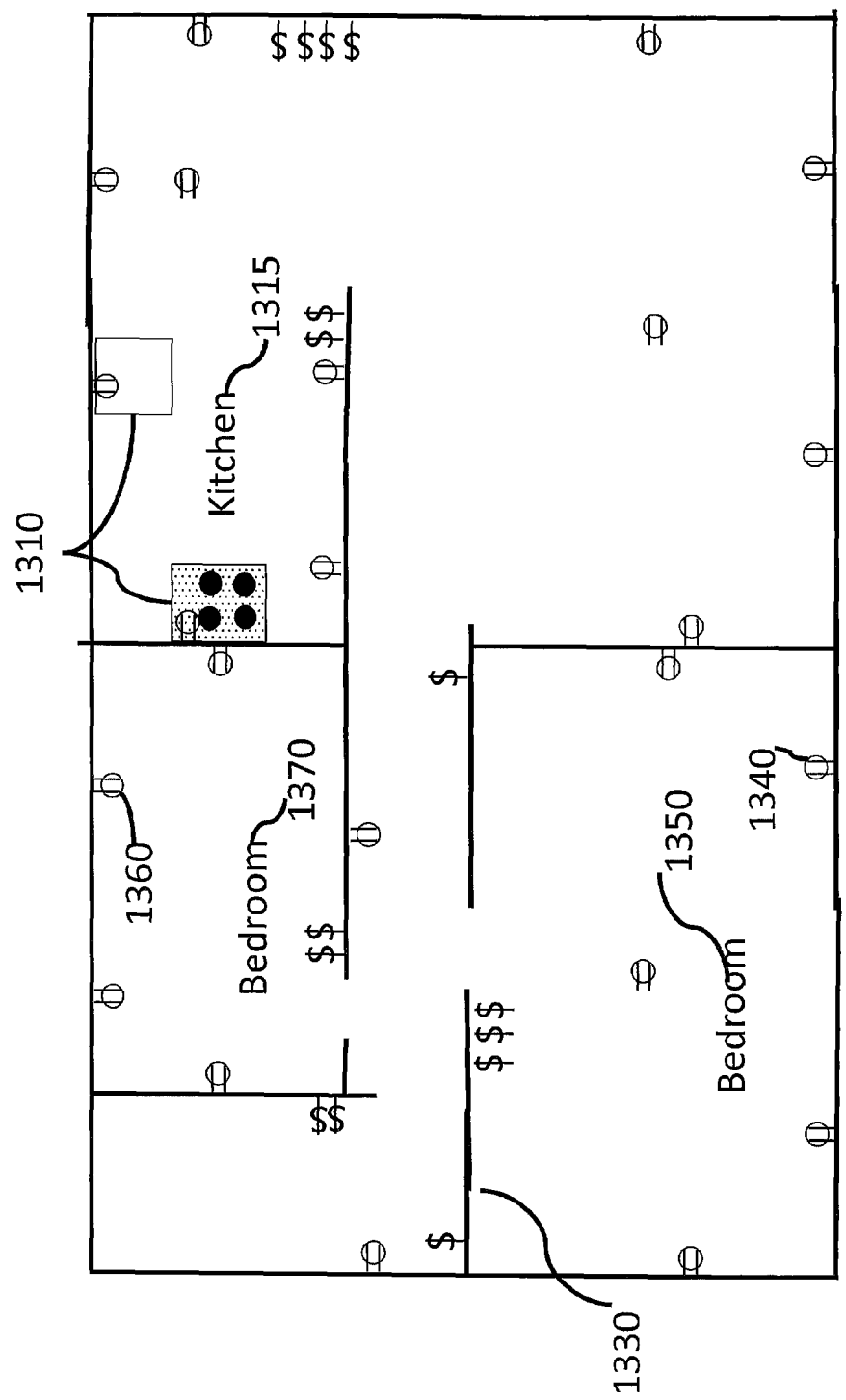
FIG. 13 shows a map generated in accordance with an embodiment of the present disclosure.

The resultant drawing 1300 is shown in FIG. 13, including outlets, switches, appliances, and ceiling devices. Because each component of the system 100 has been mapped to a specific location, the user can use the drawing to identify and control the components singularly, collectively, or in any desired combination. The system 100 can also use the picture to inform the user of changes in power consumption and/or states of the different components. For example, a graphical representation of FIG. 13 may be displayed on a suitable control device to enable a user to control various aspects of the system 100. Appliances 1310 identified from pictures taken by the user may include, for example, an oven and a refrigerator as shown in FIG. 13. Thus, the application of method 400 may determine that the space occupied by these appliances is a Kitchen 1315. The system 100 may monitor usage of power over time and determine usage of other spaces. For example, the system 100 may determine that the last lights to turn off every night are in the Master Bedroom 1350. For example, after several days of the load connected to outlet 1340 turning off last in the evening, e.g., 3 days, 4 days, 5 days or even a week, the system 100 may determine that the room occupied by outlet 1340 is a Bedroom and a Bedroom label 1350 may be attached to the drawing 1300.

In at least one embodiment of the present disclosure, the system 100 may use the outlet power monitor 340 to determine a characteristic of the power drawn by an appliance attached to an outlet. From that characteristic, the system 100 may determine an identity of the appliance. With reference to FIG. 13, for example, the system 100 may determine that an alarm clock is attached to outlet 1360, and the alarm clock draws power indicative of sounding an alert at, e.g., 7 am in the morning. Because alarm clocks are typically located in a bedroom, the system 100 may label space 1370 as a bedroom. Thus, the system 100 may determine the identity of appliance(s) attached to the electrical grid of the location, and if the appliance(s) is typically used in a location then the location of the appliance(s) may be identified. Further, for example, if a hair dryer is identified as plugged into a particular outlet and consumes power at that outlet, the system 100 may determine the location of the hairdryer to be a bedroom or a bathroom, since conventionally, hairdryers are used almost exclusively in bedrooms or bathrooms.

Comparing the generated drawing 1300 of FIG. 13 to the blueprint 600 of FIG. 6 shows that a door 640 connects the Master Bedroom to the Bath. Further comparison to FIG. 11 shows that the user did not walk through this doorway, indicated by location 1150. Therefore, method 400 would not account for the door 640 and omit it from the drawing. In some embodiments, however, a user may be prompted to walk through all doorways while the application is running. The user may also manually add any features, such as doorway 640, missing from the generated drawing. Thus, the method 400 may be used to generate an approximation of the blueprint drawing 600 of the exemplary two bedroom home of FIG. 6. It is advantageously created with simple user actions and input that do not require the user to upload and/or tediously draw a blueprint or schematic. Further, the generated drawing 1300 shows all components of the automation system 100 located and mapped according to method 400.

The method 400 may enable the user to create an image representing various physical aspects of the location treated. It is possible that the physical aspects may not be needed and the user may desire a logical mapping of the automation system 100 components. That is, the user may desire a list indicating a location association among components, e.g., indicating which components are in which rooms of the structure without the need of creating a blueprint drawing.

Figure 14:
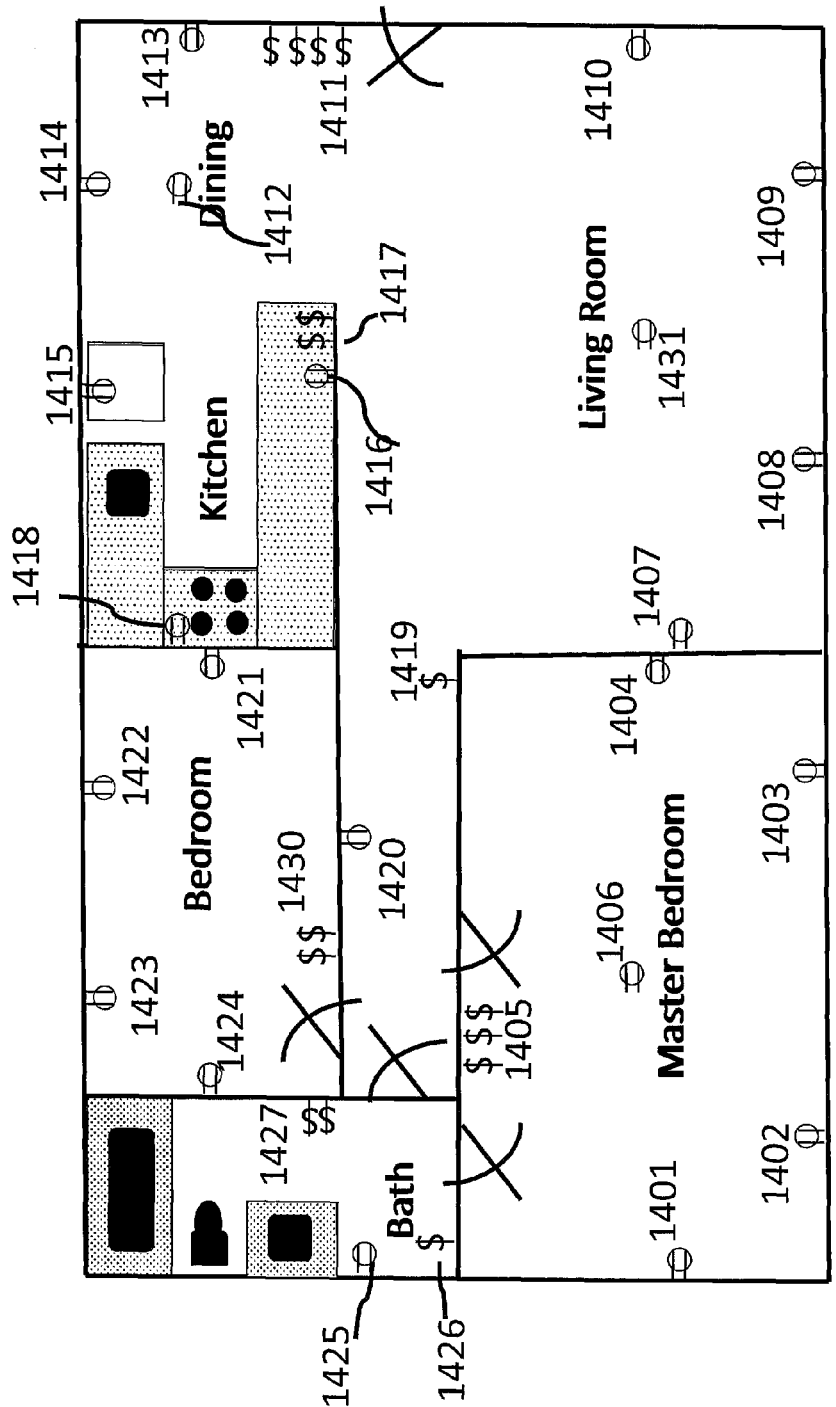
FIG. 14 shows a map generated in accordance with an embodiment of the present disclosure.

Switches and/or outlets according to the present disclosure may include one or more sensors (e.g., sensors 240 and 370 shown in FIGS. 2 and 3, respectively) such as ambient light sensors. Referring to FIG. 14, when a light is turned "on" in the Bath, for example, one or more ambient light sensors in components 1425, 1426, and 1427 may all register the increase in ambient light at the same time. Further, the increase in ambient light may be unique to components 1425, 1426, and 1427, such that when the ambient light is measured by these three components, other components do not measure an increase in ambient light. Thus, it may be determined that components 1425, 1426, and 1427 are located in the same room, e.g., the Bath, as the switch and light that are activated.

When a light is turned "on" or "off" in the Master Bedroom, each of components 1401, 1402, 1403, 1404, and 1405 may detect a change in ambient light and thus determined to be located in the same room as the deactivated light and corresponding switch. Component 1406 in FIG. 14 may be a ceiling fan and slave to one of the switches in a switch bank 1405. Because ceiling fan 1406 is slave to switch bank 1405, it may be determined to be located in the same room, e.g., the Master Bedroom. It is expected that ambient light changes from sunrise and sunset will be detected by multiple components of the system 100, e.g., throughout the structure, and thus may be discounted. In addition, the system 100 may obtain the times for sunrise and/or sunset from the Internet or other sources known in the art such that the system may discount or ignore and ambient light changes that coincide with sunrise or sunset.

The system 100 may also determine that components 1421, 1422, 1423, 1424, and 1430 are located in the same room via ambient light sensors. For example, if a light is turned on in the Bedroom, ambient light sensors in the Bedroom may uniquely detect a change in light, thus indicating that the components are located in a single room.

Component 1418 is connected to an oven, which may be identified by a connected power sensor 340. Similarly, the power sensor 340 may determine that the outlet 1415 is connected to a refrigerator. Ovens and refrigerators are generally expected to have unique power consumption characteristics, thus allowing for unique identification. Further, these appliances may be inferred as located together, e.g., in the Kitchen.

Ambient light sensors in components 1407, 1408, 1409, 1410, 1411, 1413, 1414, 1416, 1417, 1419, and 1420 may all uniquely detect a light is turned on in the Living Room. Components 1412 and 1431 may be ceiling-mounted fixtures such as ceiling fans and/or overhead lights. For purposes of this example components 1412 and 1431 may be slaves to switches in switch bank 1411. Since the devices are tied to switch bank 1411, the devices may be presumed to be located in the same room, e.g., the Living Room.

Each of the location associations determined above, e.g., groupings of components located in the same room, may be tabulated as shown in FIGS. 15 and 16. For example, tables 1500 and 1600 indicate that components 1425-1427 are located in room #1 (e.g., the Bath), components 1401-1406 are located in room #2 (e.g., the Master Bedroom), components 1421-1430 are located in room #3 (e.g., the Bedroom), components 1415 and 1418 (the oven and refrigerator, respectively) are located in the Kitchen, and components 1407-1431 are located in room #4 (e.g., the Living Room).

Thus, the methods presently disclosed, e.g., method 400, enable a user to generate a map representing physical aspects of a particular structure. In some cases, the physical aspects are not needed and the user may require a logical mapping of the components of the automation system 100. That is, the user may desire a list indicating which components are located in which rooms without the need to create a blueprint drawing. Other sensor data may be used to further establish which devices are in the same rooms. For example, cameras from multiple devices may capture a piece of furniture or capture a pet or person at the same time indicating the devices are in the same room. Further, for example, similar noise(s) detected by multiple devices (e.g., at a similar or the same decibel level) may indicate that the devices are in close proximity, such as in the same room.

Figure 17:
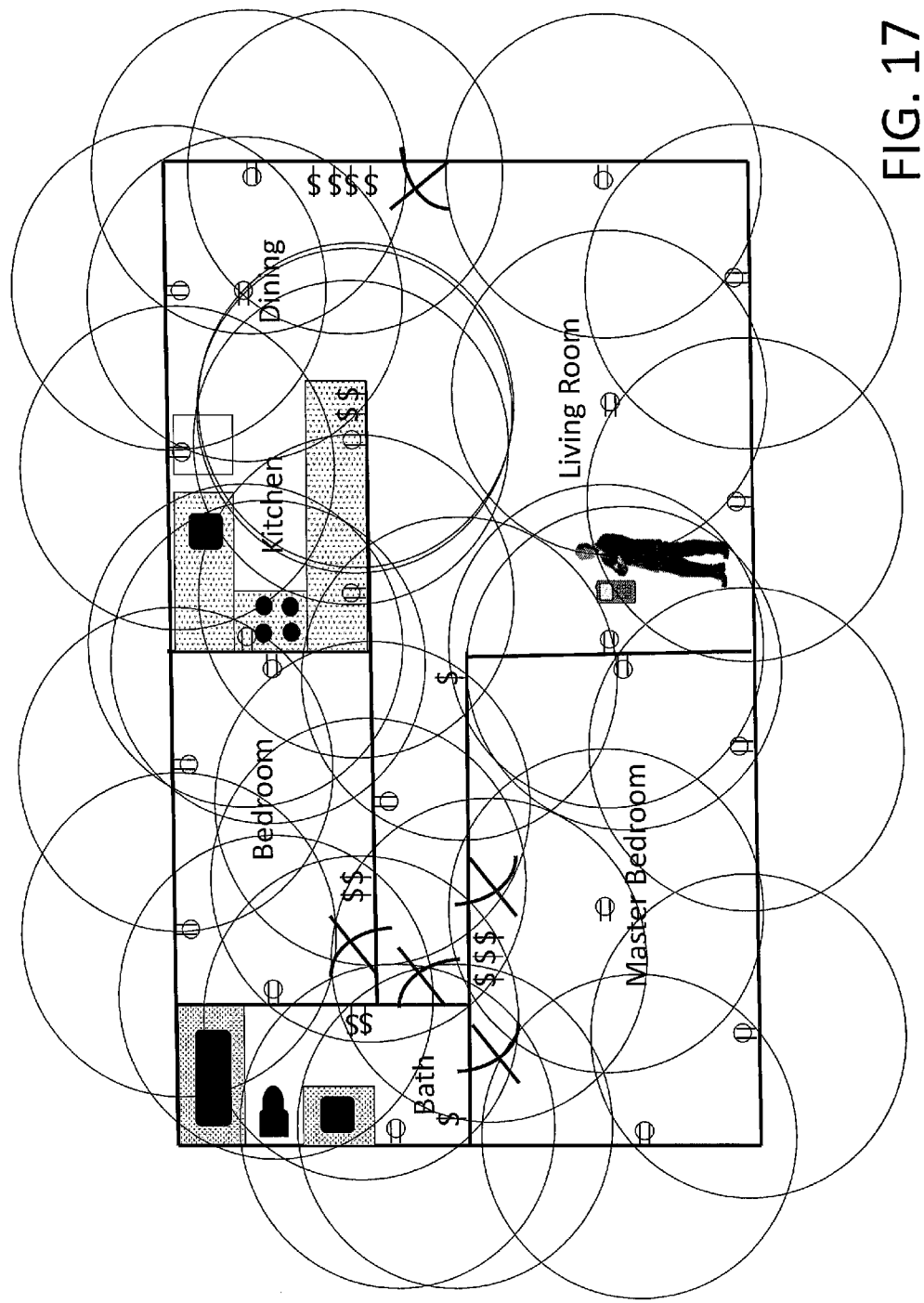
FIG. 17 shows an example of a structure including an automation system, in accordance with an embodiment of the present disclosure.

The methods presently disclosed may be used to generate the data of tables 1500 and 1600 shown in FIGS. 15 and 16, respectively, without requiring a user to meticulously enter the information. It should be noted that table 1600 can be further edited, e.g., by an installer of an automation system or home owner, to increase its usefulness. For example, rooms or spaces of the home may be given descriptive names, e.g., to distinguish components located in a Dining Room from components located in a Living Room. As described above, the system may autonomously identify a common association among components of the system based on an identifying characteristic, e.g., response to a condition or stimuli detected by a sensor. FIG. 17 shows concentric circles around each component of the system 100 to indicate a radius of a transmitted signal. Each component can transmit signals to and receive signals from the other components. If located close together, a first component may receive a strong signal from a second component. The term "strong" may be precisely or arbitrarily determined, and may depend on a component's antenna or frequency band of operation, obstacles between components, and/or the performance of receivers and transmitters. The system 100 may determine that two components are in close proximity if a second component is within the radius of the first component. This determination provides additional information to the system 100 regarding which components are in physical proximity to one another, and therefore may be located in the same room. In addition, any suitable method of triangulation may be used to identify a location or proximity of components of system 100.

Thus, an automation system 100 in accordance with the present disclosure may determine whether different components of the system are in the same room based on the components' locations. By taking pictures of the components and identifying them, a table 1500 as in FIG. 15 that indicates the location of each component can be constructed. Furthermore, by compiling further information from the components such as, e.g., ambient light characteristics, motion, temperature, air flow, moisture (e.g., water, rain, or humidity), contaminants, a location obtained from the camera used to take a picture of the component, radiofrequency (RF) or other electromagnetic signal information and/or load information determined from the power sensor 340 of the outlets the logical locations of the devices may be estimated and presented to the user or installer.

It is understood that the present disclosure is not limited to the particular forms, embodiments and examples illustrated. The method and apparatus of the disclosure can be practiced with and modifications and variations that do not depart from the spirit and scope of the disclosure.

Embodiments of the present disclosure may be used in connection with any structure, including, but not limited to, homes, offices, business, schools, churches, sporting complexes. In addition, at least certain aspects of the aforementioned embodiments may be combined with other aspects of the embodiments, or removed, without departing from the scope of the disclosure.

Other embodiments of the present disclosure will be apparent to those skilled in the art from consideration of the specification and practice of the embodiments disclosed herein. It is intended that the specification and examples be considered as exemplary only, with a true scope and spirit of the disclosure being indicated by the following claims.

We claim:

1. A method of mapping the physical location of components of an automation system, comprising:
    identifying at least one component of a plurality of components of the automation system, including:
        obtaining an image of the at least one component, the image being captured by a wireless device, the device having a location;
        identifying the at least one component in the image; and
        associating the at least one component with the location;
    recording the location of the at least one component, wherein recording the location of the at least one component includes drawing a line to represent a wall where the component was imaged and extending the line to a predetermined length; and
    generating a map based on the location of the at least one component.

2. The method of claim 1, wherein identifying the at least one component further includes activating the component.

3. The method of claim 2, wherein the at least one component includes an outlet and identifying the outlet includes activating a load connected to the outlet.

4. The method of claim 1, wherein identifying the at least one component includes determining an energy use characteristic of the component.

5. The method of claim 1, further comprising identifying each component of the plurality of components.

6. The method of claim 1, further comprising determining a location association amongst at least two components of the plurality of components.

7. The method of claim 6, wherein the at least two components are in communication with a sensor and the location association is determined from the sensor.

8. The method of claim 7, wherein the at least one sensor detects one of light, sound, motion, energy-use, moisture, or any combination thereof.

9. The method of claim 1, wherein recording the location of the at least one component further includes extending the line to intersect an adjacent line.

10. The method of claim 1, wherein at least a portion of the line is deleted based on location information provided by the wireless device.

11. The method of claim 1, wherein the plurality of components includes a first component and a second component, the method comprising identifying each of the first component and the second component, recording the location of the first component and the second component, and generating a map based on the locations of the first component and the second component, wherein the map includes at least one wall segment determined based on the locations of the first component and the second component.

12. The method of claim 11, wherein identifying the first component and the second component includes obtaining an image of each component from a wireless device, the wireless device having a location for each image, identifying the first component and the second component in the respective images; and associating the first component and the second component with the location of the wireless device when obtaining each image.

13. The method of claim 11, wherein the at least one wall segment includes two wall segments determined based on the locations of the first component and the second component, respectively.

* * * * *